US009721157B2

(12) United States Patent
Frank et al.

(10) Patent No.: US 9,721,157 B2
(45) Date of Patent: Aug. 1, 2017

(54) SYSTEMS AND METHODS FOR OBTAINING AND USING INFORMATION FROM MAP IMAGES

(75) Inventors: John R. Frank, Cambridge, MA (US); Christopher Schmidt, Cambridge, MA (US)

(73) Assignee: Nokia Technologies Oy, Espoo (FI)

( * ) Notice: Subject to any disclaimer, the term of this patent is extended or adjusted under 35 U.S.C. 154(b) by 1171 days.

(21) Appl. No.: 11/834,594

(22) Filed: Aug. 6, 2007

(65) Prior Publication Data

US 2008/0052638 A1 Feb. 28, 2008

Related U.S. Application Data

(60) Provisional application No. 60/835,690, filed on Aug. 4, 2006.

(51) Int. Cl.
*G06K 9/00* (2006.01)
*G06K 9/72* (2006.01)

(52) U.S. Cl.
CPC ........ *G06K 9/00476* (2013.01); *G06K 9/72* (2013.01)

(58) Field of Classification Search
CPC ........ G06K 9/00; G06K 9/00476; G06K 9/72; G06K 2009/00489; G06K 7/00
USPC ............ 715/764; 382/317, 321; 345/349
See application file for complete search history.

(56) References Cited

U.S. PATENT DOCUMENTS

| | | | |
|---|---|---|---|
| 5,032,989 A | 7/1991 | Tornetta | |
| 5,278,980 A | 1/1994 | Pedersen et al. | |
| 5,623,541 A | 4/1997 | Boyle et al. | |
| 5,659,732 A | 8/1997 | Kirsch | |
| 5,664,115 A | 9/1997 | Fraser | |
| 5,668,897 A | 9/1997 | Stolfo | |
| 5,761,328 A | * 6/1998 | Solberg et al. | 382/113 |
| 5,761,538 A | 6/1998 | Hull et al. | |

(Continued)

FOREIGN PATENT DOCUMENTS

| | | |
|---|---|---|
| EP | 1 426 876 A | 6/2004 |
| GB | 2364225 | 1/2002 |

(Continued)

OTHER PUBLICATIONS

Matheson, et al., Geoparser Evaluation (geoXwalk Phase III WP 4), University of Edinburgh Data Library, Aug. 2004 (9 pages).

(Continued)

*Primary Examiner* — Rinna Yi
(74) *Attorney, Agent, or Firm* — Alston & Bird LLP

(57) ABSTRACT

Under one aspect, an interface program stored on a computer-readable medium causes a computer system with a display device to perform the functions of: displaying an image of a region of a metric vector space; obtaining a set of pixel extents in the image that contain apparent textual annotations; for each pixel extent of the set, obtaining a confidence score that the pixel extent actually contains a textual annotation; and displaying the set of pixel extents in a ranked list based on the corresponding confidence scores. In some embodiments, the program further causes the computer system to perform the functions of, for at least one pixel extent of the set, at least one of automatically generating a text string based on the apparent textual annotation, and accepting user input entering a text string based on the apparent textual annotation.

16 Claims, 11 Drawing Sheets

(56) References Cited

U.S. PATENT DOCUMENTS

| | | | |
|---|---|---|---|
| 5,764,799 A * | 6/1998 | Hong et al. ............... 382/225 |
| 5,778,362 A | 7/1998 | Deerwester et al. |
| 5,802,361 A | 9/1998 | Wang et al. |
| 5,813,005 A | 9/1998 | Tsuchida et al. |
| 5,839,088 A | 11/1998 | Hancock et al. |
| 5,845,278 A | 12/1998 | Kirsch et al. |
| 5,852,810 A | 12/1998 | Sotiroff et al. |
| 5,856,060 A | 1/1999 | Kawamura et al. |
| 5,870,559 A | 2/1999 | Leshem et al. |
| 5,878,126 A | 3/1999 | Velamuri et al. |
| 5,893,093 A | 4/1999 | Wills |
| 5,920,856 A | 7/1999 | Syeda-Mahmood |
| 5,930,474 A | 7/1999 | Dunworth et al. |
| 5,958,008 A | 9/1999 | Pogrebisky et al. |
| 5,960,447 A | 9/1999 | Holt et al. |
| 5,961,571 A | 10/1999 | Gorr et al. |
| 5,961,572 A | 10/1999 | Craport et al. |
| 5,963,956 A | 10/1999 | Smartt |
| 5,978,747 A | 11/1999 | Craport et al. |
| 5,978,804 A | 11/1999 | Dietzman |
| 5,991,754 A | 11/1999 | Raitto et al. |
| 5,991,781 A | 11/1999 | Nielsen |
| 6,035,297 A | 3/2000 | Van Huben et al. |
| 6,052,691 A | 4/2000 | Ardoin et al. |
| 6,057,842 A | 5/2000 | Knowlton et al. |
| 6,070,157 A | 5/2000 | Jacobson et al. |
| 6,092,076 A | 7/2000 | McDonough et al. |
| 6,133,913 A | 10/2000 | White et al. |
| 6,144,962 A | 11/2000 | Weinberg et al. |
| 6,148,260 A | 11/2000 | Musk et al. |
| 6,148,289 A | 11/2000 | Virdy |
| 6,151,624 A | 11/2000 | Teare et al. |
| 6,184,823 B1 | 2/2001 | Smith et al. |
| 6,202,065 B1 | 3/2001 | Wills |
| 6,219,055 B1 | 4/2001 | Bhargava et al. |
| 6,233,618 B1 | 5/2001 | Shannon |
| 6,236,768 B1 | 5/2001 | Rhodes et al. |
| 6,237,006 B1 | 5/2001 | Weinberg et al. |
| 6,240,410 B1 | 5/2001 | Wical |
| 6,240,413 B1 | 5/2001 | Learmont |
| 6,249,252 B1 | 6/2001 | Dupray |
| 6,266,053 B1 | 7/2001 | French et al. |
| 6,269,368 B1 | 7/2001 | Diamond |
| 6,275,610 B1 | 8/2001 | Hall et al. |
| 6,282,540 B1 | 8/2001 | Goldensher et al. |
| 6,295,528 B1 | 9/2001 | Marcus et al. |
| 6,341,310 B1 | 1/2002 | Leshem et al. |
| 6,343,139 B1 * | 1/2002 | Finkelstein et al. ......... 382/101 |
| 6,343,290 B1 | 1/2002 | Cossins et al. |
| 6,366,851 B1 | 4/2002 | Chojnacki et al. |
| 6,377,961 B1 | 4/2002 | Ryu et al. |
| 6,397,228 B1 | 5/2002 | Lamburt et al. |
| 6,411,293 B1 | 6/2002 | Sakamoto et al. |
| 6,470,287 B1 | 10/2002 | Smartt |
| 6,470,383 B1 | 10/2002 | Leshem et al. |
| 6,493,711 B1 | 12/2002 | Jeffrey |
| 6,542,813 B1 | 4/2003 | Kovacs |
| 6,556,990 B1 | 4/2003 | Lane |
| 6,577,714 B1 | 6/2003 | Darcie et al. |
| 6,584,459 B1 | 6/2003 | Chang et al. |
| 6,629,065 B1 | 9/2003 | Gadh et al. |
| 6,631,364 B1 | 10/2003 | Rioux et al. |
| 6,636,803 B1 | 10/2003 | Hartz, Jr. et al. |
| 6,640,145 B2 | 10/2003 | Hoffberg et al. |
| 6,701,307 B2 | 3/2004 | Himmelstein et al. |
| 6,711,585 B1 | 3/2004 | Copperman et al. |
| 6,721,728 B2 | 4/2004 | McGreevy |
| 6,731,314 B1 | 5/2004 | Cheng et al. |
| 6,741,981 B2 | 5/2004 | McGreevy |
| 6,823,333 B2 | 11/2004 | McGreevy |
| 6,850,252 B1 | 2/2005 | Hoffberg |
| 6,853,389 B1 | 2/2005 | Ikeda et al. |
| 6,859,800 B1 | 2/2005 | Roche et al. |
| 6,862,586 B1 | 3/2005 | Kreulen et al. |
| 6,871,140 B1 | 3/2005 | Florance et al. |
| 6,934,710 B1 | 8/2005 | Mills |
| 7,007,228 B1 | 2/2006 | Carro |
| 7,017,285 B2 | 3/2006 | Lakic |
| 7,024,403 B2 | 4/2006 | Kyler |
| 7,035,869 B2 | 4/2006 | Smartt |
| 7,065,532 B2 | 6/2006 | Elder et al. |
| 7,092,969 B2 | 8/2006 | Meek et al. |
| 7,107,285 B2 | 9/2006 | von Kaenel et al. |
| 7,117,199 B2 | 10/2006 | Frank et al. |
| 7,143,344 B2 | 11/2006 | Parker et al. |
| 7,163,739 B2 | 1/2007 | Koike et al. |
| 7,181,502 B2 | 2/2007 | Incertis |
| 7,233,942 B2 | 6/2007 | Nye et al. |
| 7,246,116 B2 | 7/2007 | Barsness et al. |
| 7,254,580 B1 | 8/2007 | Gharachorloo et al. |
| 7,274,332 B1 | 9/2007 | Dupray |
| 7,310,633 B1 | 12/2007 | Wang et al. |
| 7,325,201 B2 | 1/2008 | Ferrari et al. |
| 7,353,113 B2 | 4/2008 | Sprague et al. |
| 7,373,246 B2 | 5/2008 | O'Clair |
| 7,393,924 B2 | 7/2008 | Vitaliano et al. |
| 7,403,939 B1 | 7/2008 | Virdy |
| 7,411,204 B2 | 8/2008 | Appleby et al. |
| 7,428,528 B1 | 9/2008 | Ferrari et al. |
| 7,437,703 B2 | 10/2008 | Wu |
| 7,473,843 B2 | 1/2009 | Wang et al. |
| 7,483,025 B2 | 1/2009 | Roy et al. |
| 7,483,881 B2 | 1/2009 | Egnor et al. |
| 7,522,760 B1 * | 4/2009 | Will et al. .................... 382/137 |
| 7,539,693 B2 | 5/2009 | Frank et al. |
| 7,596,581 B2 | 9/2009 | Frank et al. |
| 7,676,452 B2 | 3/2010 | Doganata et al. |
| 7,698,059 B2 | 4/2010 | O'Clair |
| 7,698,336 B2 | 4/2010 | Nath |
| 7,720,723 B2 | 5/2010 | Dicker et al. |
| 7,720,806 B2 | 5/2010 | Piedmonte |
| 7,756,753 B1 | 7/2010 | McFarland |
| 7,792,883 B2 | 9/2010 | Buron et al. |
| 7,908,280 B2 | 3/2011 | Frank et al. |
| 2001/0011270 A1 | 8/2001 | Himmelstein et al. |
| 2001/0011365 A1 | 8/2001 | Helfman |
| 2001/0014185 A1 | 8/2001 | Chitradon et al. |
| 2001/0014868 A1 | 8/2001 | Herz et al. |
| 2002/0000999 A1 | 1/2002 | McCarty et al. |
| 2002/0016796 A1 | 2/2002 | Hurst et al. |
| 2002/0032677 A1 | 3/2002 | Morgenthaler et al. |
| 2002/0055924 A1 | 5/2002 | Liming |
| 2002/0065844 A1 | 5/2002 | Robinson et al. |
| 2002/0076099 A1 | 6/2002 | Sakamoto et al. |
| 2002/0078035 A1 | 6/2002 | Frank et al. |
| 2002/0082901 A1 | 6/2002 | Dunning et al. |
| 2002/0107918 A1 | 8/2002 | Shaffer et al. |
| 2002/0126905 A1 * | 9/2002 | Suzuki et al. ................ 382/229 |
| 2002/0151992 A1 | 10/2002 | Hoffberg et al. |
| 2002/0161736 A1 | 10/2002 | Beygelzimer et al. |
| 2002/0188599 A1 | 12/2002 | McGreevy |
| 2003/0001900 A1 | 1/2003 | Cabanes et al. |
| 2003/0004802 A1 | 1/2003 | Callegari |
| 2003/0004914 A1 | 1/2003 | McGreevy |
| 2003/0005053 A1 | 1/2003 | Novaes |
| 2003/0009458 A1 | 1/2003 | Nakano et al. |
| 2003/0037048 A1 | 2/2003 | Kabra et al. |
| 2003/0056175 A1 | 3/2003 | Fujihara |
| 2003/0078913 A1 | 4/2003 | McGreevy |
| 2003/0097357 A1 | 5/2003 | Ferrari et al. |
| 2003/0105682 A1 | 6/2003 | Dicker et al. |
| 2003/0187867 A1 | 10/2003 | Smartt |
| 2004/0078750 A1 | 4/2004 | Frank |
| 2004/0093328 A1 | 5/2004 | Damle |
| 2004/0095376 A1 | 5/2004 | Graham et al. |
| 2004/0100506 A1 | 5/2004 | Shiota et al. |
| 2004/0117358 A1 | 6/2004 | von Kaenel et al. |
| 2004/0119759 A1 | 6/2004 | Barros |
| 2004/0139400 A1 | 7/2004 | Allam et al. |
| 2004/0162675 A1 | 8/2004 | Moon et al. |
| 2004/0225635 A1 | 11/2004 | Toyama et al. |
| 2004/0236730 A1 | 11/2004 | Frank |
| 2005/0004910 A1 | 1/2005 | Trepess |
| 2005/0008849 A1 | 1/2005 | Kagami et al. |

(56) References Cited

U.S. PATENT DOCUMENTS

| | | |
|---|---|---|
| 2005/0091193 A1 | 4/2005 | Frank et al. |
| 2005/0091209 A1 | 4/2005 | Frank et al. |
| 2005/0096991 A1 | 5/2005 | Main, II et al. |
| 2005/0108001 A1 | 5/2005 | Aarskog |
| 2005/0108213 A1 | 5/2005 | Riise et al. |
| 2005/0108224 A1 | 5/2005 | Silverbrook et al. |
| 2005/0119824 A1 | 6/2005 | Rasmussen et al. |
| 2005/0149576 A1 | 7/2005 | Marmaros et al. |
| 2005/0193003 A1 | 9/2005 | Popovici |
| 2005/0198008 A1 | 9/2005 | Adler |
| 2005/0222879 A1 | 10/2005 | Dumas et al. |
| 2005/0246310 A1 | 11/2005 | Chang et al. |
| 2005/0270311 A1 | 12/2005 | Rasmussen et al. |
| 2005/0278378 A1 | 12/2005 | Frank |
| 2005/0278616 A1 | 12/2005 | Eller |
| 2006/0004752 A1 | 1/2006 | Harel et al. |
| 2006/0004797 A1 | 1/2006 | Riise et al. |
| 2006/0010100 A1 | 1/2006 | McAvoy et al. |
| 2006/0015722 A1 | 1/2006 | Rowan et al. |
| 2006/0026170 A1 | 2/2006 | Kreitler et al. |
| 2006/0036588 A1 | 2/2006 | Frank et al. |
| 2006/0085234 A1 | 4/2006 | Cagan |
| 2006/0117067 A1 | 6/2006 | Wright et al. |
| 2006/0122794 A1 | 6/2006 | Sprague et al. |
| 2006/0149774 A1 | 7/2006 | Egnor |
| 2006/0155679 A1 | 7/2006 | Kothuri et al. |
| 2006/0159367 A1 | 7/2006 | Zeineh et al. |
| 2006/0174209 A1 | 8/2006 | Barros |
| 2006/0179453 A1 | 8/2006 | Kadie et al. |
| 2006/0184519 A1 | 8/2006 | Smartt |
| 2006/0200259 A1 | 9/2006 | Hoffberg et al. |
| 2006/0200260 A1 | 9/2006 | Hoffberg et al. |
| 2006/0217878 A1 | 9/2006 | Bramley |
| 2006/0224587 A1 | 10/2006 | Zamir et al. |
| 2006/0238379 A1 | 10/2006 | Kimchi et al. |
| 2006/0242126 A1 | 10/2006 | Fitzhugh |
| 2006/0271281 A1 | 11/2006 | Ahn et al. |
| 2007/0011150 A1 | 1/2007 | Frank |
| 2007/0016562 A1 | 1/2007 | Cooper |
| 2007/0018953 A1 | 1/2007 | Kipersztok |
| 2007/0073748 A1 | 3/2007 | Barney |
| 2007/0078768 A1 | 4/2007 | Dawson |
| 2007/0130112 A1 | 6/2007 | Lin |
| 2007/0143318 A1 | 6/2007 | Hendrey et al. |
| 2007/0156677 A1 | 7/2007 | Szabo |
| 2007/0179932 A1 | 8/2007 | Piaton |
| 2007/0186166 A1 | 8/2007 | Anderson et al. |
| 2007/0192300 A1 | 8/2007 | Reuther et al. |
| 2007/0198495 A1 | 8/2007 | Buron et al. |
| 2007/0198951 A1 | 8/2007 | Frank |
| 2007/0219968 A1 | 9/2007 | Frank |
| 2007/0233692 A1 | 10/2007 | Lisa et al. |
| 2007/0239692 A1 | 10/2007 | McBride |
| 2007/0266337 A1 | 11/2007 | Friedland et al. |
| 2007/0288160 A1 | 12/2007 | Ebert |
| 2007/0288431 A1 | 12/2007 | Reitter et al. |
| 2007/0288437 A1 | 12/2007 | Xia |
| 2007/0294233 A1 | 12/2007 | Sheu et al. |
| 2008/0005101 A1 | 1/2008 | Chandra |
| 2008/0010262 A1 | 1/2008 | Frank |
| 2008/0010273 A1 | 1/2008 | Frank |
| 2008/0010605 A1 | 1/2008 | Frank |
| 2008/0033935 A1 | 2/2008 | Frank |
| 2008/0033936 A1 | 2/2008 | Frank |
| 2008/0033944 A1 | 2/2008 | Frank |
| 2008/0040336 A1 | 2/2008 | Frank |
| 2008/0052638 A1 | 2/2008 | Frank et al. |
| 2008/0056538 A1 | 3/2008 | Frank |
| 2008/0059452 A1 | 3/2008 | Frank |
| 2008/0065685 A1 | 3/2008 | Frank |
| 2008/0068380 A1 | 3/2008 | McAvoy et al. |
| 2008/0074423 A1 | 3/2008 | Gan et al. |
| 2008/0086356 A1 | 4/2008 | Glassman et al. |
| 2008/0126191 A1 | 5/2008 | Schiavi |
| 2008/0131003 A1 | 6/2008 | Bober |
| 2008/0140348 A1 | 6/2008 | Frank |
| 2008/0215524 A1 | 9/2008 | Fuchs et al. |
| 2009/0119255 A1 | 5/2009 | Frank et al. |
| 2009/0132316 A1 | 5/2009 | Florance et al. |
| 2009/0183097 A1 | 7/2009 | Bayiates |
| 2009/0299975 A1 | 12/2009 | Coifman et al. |
| 2010/0106752 A1 | 4/2010 | Eckardt, III et al. |
| 2010/0188210 A1 | 7/2010 | Howard et al. |
| 2013/0132375 A1 | 5/2013 | Jones et al. |

FOREIGN PATENT DOCUMENTS

| | | |
|---|---|---|
| WO | WO-2005/114484 | 12/2005 |
| WO | WO 2005/114484 | 12/2005 |
| WO | WO-2007/002800 | 1/2007 |

OTHER PUBLICATIONS

Nadeau, et al., "Unsupervised Named-Entity Recognition: Generating Gazetteers and Resolving Ambiguity", Published at the 19th Canadian Conference on Artificial Intelligence, Quebec City, Quebec, Canada Jun. 7, 2006, NRC 48727 (13 pages).

Soffer, et al., "Integrating Symbolic Images into a Multimedia Database System using Classification and Abstraction Approaches", VLDB Journal, 7:253-274 (1998).

Office action for related U.S. Appl. No. 11/834,598 dated Jan. 20, pp. 1-37.

Office action for related U.S. Appl. No. 11/834,600 dated Feb. 22, 2011, pp. 1-24.

Office action for related U.S. Appl. No. 11/834,987 dated Mar. 7, 2011, pp. 1-36.

International Search Report from PCT/US2007/075294, mailed Feb. 6, 2008.

MetaCarta, "A White Paper on MetaCarta's Technology and Products", http://www.metacarta.com/docs/Corporate_White_Paper.pdf, Internet Citation, [Online], 2005.

David Nadeau et al: "Unsupervised Named-Entity Recognition: Generating Gazetteers and Resolving Ambiguity" Advances in Artificial Intelligence Lecture notes in Computer Science; Lecture Notes in Artificial Intelligence; LNCS, Springer-Verlag, BE, vol. 4013, (Jun. 7, 2006), 19th Conference of the Canadian Society for Computational Studies of Intelligence, Quebec City.

International Search Report, International Application No. PCT/US07/075289, mailed Feb. 12, 2008 (4 pages).

Beard and Sharma, Multidimensional ranking for data in digital spatial libraries, Int. J. Digit. Libr. 1, pp. 153-160 (1997).

Chen, et al., "The BioPortal Project: A National Center of Excellence for Infectious Disease Informatics", Proceedings of the 2006 International Conference on Digital Government Research, May 21-24, 2006, pp. 373-374.

Christel, M.G. et al., "Interactive Maps for a Digital Video Library", IEEE Multimedia, IEEE Service Center, New York, NY, vol. 7, No. 1, Jan. 2000, pp. 60-67, XP000908490.

Clifton, et al., "GeoNODE: An End-to-End System from Research Components", the 17th International Conference on Data Engineering, Heidelberg, Germany, Apr. 2-6, 2001.

Duhring, "Geospatial Archive and Exploitation System", SGI White Paper, pp. 1-12 (Dec. 2001).

European Patent Office, Supplementary Partial European Search Report, for application No. EP 01925106.5-2001/US0140173, mailed Jun. 3, 2005, 2 pages.

Excerpts from Texis Tutorial, URL http://www.thunderstone.com/texis/site/demos/map/, 9 pages.

Gaede, V., "Multidimensional Access Methods", ACM Computing Surveys, vol. 30, No. 2, Jun. 1998, pp. 170-231.

Guting R H: "An Introduction to Spatial Database Systems" VLDB Journal, vol. 3, No. 4, Oct. 1994, pp. 357-399.

Hill and Rasmussen, "Geographic Indexing Terms as Spatial Indicators", in *Studies in Multimedia: State-of-the-Art Solutions in Multimedia and Hypertext*, Stone, et al., (Eds.), Medford, NJ: Learned Information, pp. 9-20, 1992.

Hill, "Spatial Access to, and Display of, Global Change Data: Avenues for Libraries", Proceedings of the Data Processing Clinic

(56) References Cited

OTHER PUBLICATIONS

Geographic Information Systems and Libraries: Patrons, Maps, and Spatial Information, pp. 125-150, 1995.

Hyland, et al., "GEONODE: Visualizing News in Geospatial Context", Federal Data Mining Symposium and Exposition '99, AFCEA, Mar. 9-10, 1999, Washington, D.C., 12 pages.

International Search Report for International Patent Application No. PCT/US2007/013807 mailed Oct. 1, 2008, 8 pages.

International Search Report for PCT/US2007/003769, mailed Aug. 2, 2007, 4 pages.

International Search Report from PCT/US2007/075266 mailed Jan. 14, 2008, 13 pages.

International Search Report from PCT/US2007/075289, Mailed Feb. 12, 2008, 4 pages.

International Search Report from PCT/US2007/075294, Mailed Feb. 6, 2008, 4 pages.

International Search Report issued for PCT/US2007/083238, dated May 21, 2008, 15 pages.

International Search Report, PCT/US2006/025296, mailed Feb. 9, 2007, 6 pages.

Internet Website: http://mapsonus.switchboard.com/bin/maps-route, Show Route, pp. 1-3, Show Map, pp. 1-2, Jun. 14, 2001, 5 pages.

Internet Website: http://www.bbc.co.uk/h2g2/guide, The Hitchiker's Guide to the Galaxy, pp. 1-2, Jun. 14, 2001, 2 pages.

Internet Website: http://www.dogpile.com, homepage, pp. 1; Dogpile Local Search, pp. 1, Jun. 14, 2001, 2 pages.

Internet website: http://www.mapblast.com, home page, Jun. 14, 2001, 1 page.

Internet Website: http://www.mapplanet.com, home page, p. 1; Guided Tour—Introduction, p. 1; Guided Tour—Navigation, p. 1; Guided Tour—Claming a cell, p. 1; Guided Tour—Registration, p. 1; Guided Tour—Signing in, p. 1; Guided Tour—Searching, p. 1; Guided Tour—Technical Requirements, p. 1, Jun. 14, 2001, 8 pages.

Internet Website: http://www.northernlight.com, home page, pp. 1-2, 2000 Press Releases, Dec. 6; pp. 1-3, 2000 Press Releases, Jan. 19, pp. 1-3, 8 pages.

Internet Website:"http//www.ismap.com", home page; Locate addresses and local services in Europe, pp. 1-2, Jun. 14, 2001, 3 pages.

Korn, "A Taxonomy of Browsing Methods: Approaches to the Lost in Concept Space Problem", University of Maryland, Department of Computer Science, 1996, 27 pages.

Larson, "Geographic Information Retrieval and Spatial Browsing", in *Geographic Information Systems and Libraries: Patrons, Maps, and Spatial Information*. Papers presented at the 1995 Clinic on Library Applications of Data Processing, pp. 1, 80-123 (1995).

Larson, et al., "The Sequoia 2000 Electronic Repository," Digital Technical Journal, vol. 7(3), pp. 50-65 (1995).

Liu, et al., "A New Point Process Transition Density Model for Space-Time Event Prediction", IEEE Transactions on Systems, Man, and Cybernetics: Part C: Applications and Reviews, 34(3):310-324 (2004).

Liu, et al., "Criminal Incident Prediction Using a Point-Pattern-Based Density Model", International Journal of Forecasting, 19(4):603-622 (2003).

Mapquest, retrieved from the Internet: http://www.mapquest.com, retrieved Apr. 20, 2001, 9 pages.

MetaCarta, "A White Paper on MetaCarta's Technology and Products", XP002463193, 2005, 24 pages.

Ooi, B.C., "Indexing in Spatial Databases", http://www.comp.nus.edu.sg/-ooibc/papers.html, a Spatial Indexing Structures (long survey) 1993, pp. 1-71.

Open GIS Consortium, Request for Quotation and Call for Participation in the OGC Geospatial Fusion Services Testbed Phase 1, Jun. 2000, 93 pages.

Petras, et al., "Time Period Directories: A Metadata Infrastructure for Placing Events in Temporal and Geographic Context", Proceedings of the 6th ACM.IEEE-CS Joint Conference on Digital Libraries, Jun. 2006, pp. 151-160, XP002478581.

Plazanet et al., "Experiments with Learning Techniques for Spatial Model Enrichment and Line Generalization", GeoInformatica 2:4, pp. 315-333 (1998).

Robertson, S.E. et al., "Simple, proven approaches to text retrieval", Technical Report, University of Cambrige, No. 356, May 1997, pp. 1-7.

Sekine and Isahara, "IREX Project Overview", Proceedings of LREC 2000: 2nd International Cofnerence on Language Resources & Evaluation, Athens (2000), 6 pages.

Sester et al., "Linking Objects of Different Spatial Data Sets by Integration and Aggregation", GeoInformatica 2:4, pp. 335-358 (1998).

Smith, T., "A Digital Library for Geographically Referenced Materials" IEEE Computer (1996), vol. 29, pp. 54-60.

Su et al., "Morphological Models for the Collapse of Area Features in Digital Map Generalization", GeoInformatica 2:4, pp. 359-382 (1998).

Vilain, et al., "Exploiting Semantic Extraction for Spatiotemporal Indexing in GeoNODE", Published Apr. 2000, 9 pages.

Ware and Jones, "Conflict Reduction in Map Generalization Using Iterative Improvement", GeoInformatica 2:4, pp. 383-407 (1998).

Weibel and Jones, "Computational Perspectives on Map Generalization", GeoInformatica 2:4, pp. 307-314 (1998).

Woodruff, et al., "GIPSY: Georeferenced Information Processing SYstem", Computer Science Division University of California, Berkley and Library and Information Studies, University of California Berkley, pp. i-iii and 1-21 (1994).

Zeng, et al., "West Nile Virus and Botulism Portal: A Case Study in Infectious Disease Informatics", Lecture Notes in Computer Science: Intelligence and Security Informatics [Online], vol. 3037/2004, Aug. 24, 2004, pp. 28-41.

Alexander Markowetz et al., Design and Implementation of a Geographic Search Engine, Jun. 16-17, 2005, 8th International Workshop on the Web and Databases (WebDB 2005), p. 1-6.

European Office action for corresponding EP app. No. 01925106.5-2201 dated Aug. 9, 2007, pp. 1-5.

Intl Preliminary Report on Patentability for corresponding Intl app. No. PCT/US2007/003769 dated Aug. 12, 2008, pp. 1-7.

Intl preliminary report on patentablity for corresponding intl app. No. PCT/US2006/025296 dated Jan. 9, 2008, pp. 1-9.

Intl preliminary report on patentablity for corresponding intl app. No. PCT/US2007/013807 dated Dec. 16, 2008, pp. 1-10.

Intl preliminary report on patentablity for corresponding intl app. No. PCT/US2007/075289 dated Feb. 10, 2009, pp. 1-8.

Intl preliminary report on patentablity for corresponding intl app. No. PCT/US2007/075294 dated Feb. 10, 2009, pp. 1-6.

Intl preliminary report on patentablity for corresponding intl app. No. PCT/US2007/083238 dated May 5, 2009 pp. 1-7.

Office action for related U.S. Appl. No. 11/834,538 dated Sep. 27, 2010, pp. 1-28.

Office action for related U.S. Appl. No. 11/834,563 dated Sep. 24, 2010, pp. 1-42.

Office action for related U.S. Appl. No. 11/834,566 dated Oct. 14, 2010, pp. 1-32.

Office action for related U.S. Appl. No. 11/834,598 dated Jul. 20, 2010, pp. 1-32.

Office action for related U.S. Appl. No. 11/834,600 dated Aug. 31, 2010, pp. 1-20.

Office action for related U.S. Appl. No. 11/834,987 dated Oct. 5, 2010, pp. 1-63.

Sherry Koshman, Visualization-Based Information Retrieval on the Web, May 9, 2006, vol. 28, Issue 2, Summer 2006, pp. 192-207.

Supplementary European search report for corresponding EP app. No. 01925106.5-2201 dated Aug. 24, 2005, pp. 1-5.

Supplementary partial European search report for corresponding EP app. No. 01925106.5-2201 dated Jun. 3, 2005, pp. 1-4.

Office action for related U.S. Appl. No. 11/834,598 dated Jun. 23, 2011, pp. 1-33.

Office action for related U.S. Appl. No. 11/834,600 dated Jun. 29, 2011, pp. 1-26.

European Office Action for corresponding EP app. No. 06 774 239.5-1952 dated May 11, 2016.

Office Action from U.S. Appl. No. 15/226,155 dated Aug. 25, 2016.

(56) References Cited

OTHER PUBLICATIONS

Ceseli et al.; "Modeling and Assessing Interference Exposure in Encrypted Databases"; ACM Transactions on Information and System Security; vol. 8, No. 1; Feb. 2005; pp. 119-152.
Clough, Paul: "Extracting Metadata for Spatially-Aware Information Retrieval on the Internet"; In: "Proceedings of the 2005 workshop on Geographic information retrieval" 2005; Association for Computing Machinery; New York, US; XP002530069.
European Office Action for corresponding EP app. No. 06 774 239.5-1952 dated Jul. 16, 2015.
European Office Action for corresponding EP app. No. 06 774 239.5-2201 dated Feb. 23, 2011.
Final Office Action for U.S. Appl. No. 09/791,533, dated Jan. 14, 2004.
Final Office Action for U.S. Appl. No. 09/791,533, dated May 31, 2005.
Final Office Action for U.S. Appl. No. 11/705,269, dated Jun. 11, 2010.
Final Office Action for U.S. Appl. No. 11/705,368, dated Dec. 30, 2010.
Final Office Action for U.S. Appl. No. 11/705,368, dated May 20, 2010.
Final Office Action for U.S. Appl. No. 11/818,066, dated Apr. 1, 2010.
Final Office Action for U.S. Appl. No. 11/818,074, dated Apr. 29, 2010.
Final Office Action for U.S. Appl. No. 11/834,538, dated May 13, 2010.
Final Office Action for U.S. Appl. No. 11/834,563, dated May 13, 2010.
Final Office Action for U.S. Appl. No. 11/834,566, dated May 27, 2010.
Final Office Action for U.S. Appl. No. 11/834,598, dated Jun. 23, 2011.
Final Office Action for U.S. Appl. No. 11/857,987, dated Mar. 7, 2011.
Final Office Action for U.S. Appl. No. 11/857,987, dated May 28, 2010.
Final Office Action for U.S. Appl. No. 11/963,451, dated Jun. 18, 2015.
Final Office Action for U.S. Appl. No. 11/963,451, dated Sep. 21, 2011.
Fu, Gaihua et al.; "Building a Geographical Ontology for Intelligence Spatial Search on the Web"; Proceedings of the Iasted International Conference on Databases and Applications (DBA2005); Feb. 14, 2005; XP002530039.
Fu, Gaihua et al.; "Ontology-Based Spatial Query Expansion in Information Retrieval"; In "Lecture Notes in Computer Science 3761: On the Move to Meaningful Internet Systems 2005: CoopIS, DOA, and ODBASE"; Oct. 11, 2005, Springer, Berlin, Germany, XP019022991; pp. 1466-1482.
International Search Report and Written Opinion from International Application No. PCT/US2007/088737, dated Sep. 11, 2009.
International Search Report for International Application No. PCT/US01/40173, dated Jun. 28, 2001.
International Search Report for International Application No. PCT/US2007/013807 mailed Oct. 1, 2008, 8 pages.
Jones, et al.; "The SPIRIT Spatial Search Engine: Architecture, Ontologies and Spatial Indexing"; Lecture Notes in Computer Science; vol. 3234; 2004; pp. 125-139; XP002530038.
*Keyhole Markup Language* [online] [retrieved Oct. 26, 2015]. Retrieved from the Internet: <URL: http://code.google.com/apis/kml/documentation/kml_tags_21.html>. 160 pages.
Luo, Si et al.; "A Semisupervised Learning Method to Merge Search Engine Results"; Oct. 2003; ACM NY; vol. 21, pp. 457-491.
Maass, Henning; "Location-Aware Mobile Applications Based on Directory Services"; ACM Mobile Networks and Applications; Aug. 1998; pp. 157-173.
MetaCarta, "MetaCarta GTS Systems", Feb. 6, 2005, pp. 1-2, Retrieved from the Internet: URL:http://web.archive.org/web/20050206162128/www.metacarta.com/products/gts/index.html [retrieved on Feb. 18, 2011].
MetaCarta, "Technology", Feb. 6, 2005, pp. 1-4, Retrieved from the Internet: URL:http://web.archive.org/web/20050206071702/www.metacarta.com/technology/ind.
Notice of Allowance for U.S. Appl. No. 09/791,533, dated Mar. 1, 2006.
Notice of Allowance for U.S. Appl. No. 11/705,368, dated Aug. 28, 2015.
Notice of Allowance for U.S. Appl. No. 11/818,074, dated May 2, 2011.
Notice of Allowance for U.S. Appl. No. 11/963,451 dated Nov. 10, 2015.
Office Action for Canadian Patent Application No. 2,641,986, dated Jan. 22, 2013, pp. 1-4.
Office Action for related U.S. Appl. No. 11/705,269, dated Sep. 2, 2011.
Office Action for U.S. Appl. No. 09/791,533, dated Aug. 13, 2003.
Office Action for U.S. Appl. No. 09/791,533, dated Jan. 6, 2005.
Office Action for U.S. Appl. No. 09/791,533, dated Nov. 1, 2005.
Office Action for U.S. Appl. No. 11/705,269, dated Sep. 21, 2009.
Office Action for U.S. Appl. No. 11/705,368, dated Aug. 10, 2009.
Office Action for U.S. Appl. No. 11/705,368, dated Aug. 31, 2010.
Office Action for U.S. Appl. No. 11/705,368, dated Oct. 24, 2011.
Office Action for U.S. Appl. No. 11/811,976, dated Jun. 23, 2010.
Office Action for U.S. Appl. No. 11/811,976, dated Nov. 17, 2010.
Office Action for U.S. Appl. No. 11/818,066, dated Jul. 23, 2009.
Office Action for U.S. Appl. No. 11/818,074, dated Aug. 6, 2009.
Office Action for U.S. Appl. No. 11/818,074, dated Sep. 30, 2010.
Office Action for U.S. Appl. No. 11/834,538, dated Aug. 24, 2009.
Office Action for U.S. Appl. No. 11/834,563, dated Aug. 24, 2009.
Office Action for U.S. Appl. No. 11/834,566, dated Oct. 14, 2010.
Office Action for U.S. Appl. No. 11/834,566, dated Sep. 8, 2009.
Office Action for U.S. Appl. No. 11/834,584, dated Sep. 9, 2009.
Office Action for U.S. Appl. No. 11/857,987, dated Oct. 5, 2010.
Office Action for U.S. Appl. No. 11/857,987, dated Sep. 17, 2009.
Office Action for U.S. Appl. No. 11/932,438, dated Oct. 8, 2010.
Office Action for U.S. Appl. No. 11/963,451, dated Dec. 1, 2014.
Office Action for U.S. Appl. No. 11/963,451, dated Mar. 21, 2011.
Office Action for U.S. Appl. No. 11/963,451, dated Sep. 17, 2010.
OpenLayers 3 [online] [retrieved Oct. 26, 2015]. Retrieved from the Internet: <URL:http://www.openlayers.org>. 3 pages.
Notice of Allowance for U.S. Appl. No. 11/705,368, dated Mar. 28, 2016.
Notice of Allowance for U.S. Appl. No. 15/226,155 dated Jan. 3, 2017.
Decision to Refuse Application for European Application No. 06 774 239.5 dated Dec. 14, 2016, 19 pages.
Brief Communication regarding Oral Proceedings for European Application No. 06 774 239.5 dated Nov. 15, 2016, 5 pages.
Summons to Attend Oral Proceedings for European Application No. 07 750 597.2 dated Nov. 18, 2016, 11 pages.
Summons to Attend Oral Proceedings for European Application No. 07 750 597.2 dated Dec. 23, 2016, 2 pages.
Summons to Attend Oral Proceedings for European Application No. 01 925 106.5 dated Nov. 2, 2016, 43 pages.
Summons to Attend Oral Proceedings for European Application No. 01 925 106.5 dated Nov. 30, 2016.

* cited by examiner

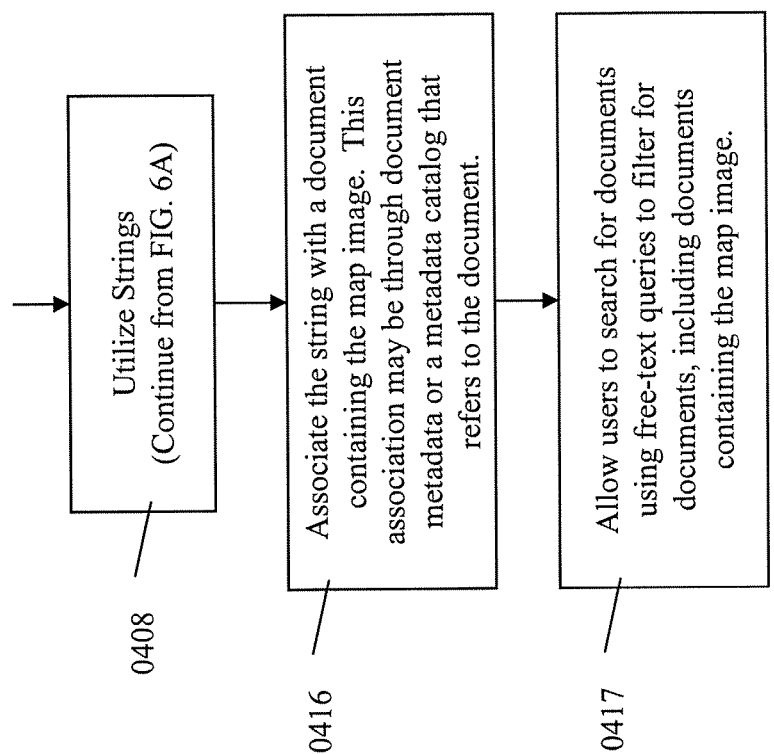

SYSTEMS AND METHODS FOR OBTAINING AND USING INFORMATION FROM MAP IMAGES

CROSS REFERENCE TO RELATED APPLICATIONS

This application claims the benefit of U.S. Provisional Application No. 60/835,690, filed Aug. 4, 2006 and entitled "Geographic Text Search Enhancements," the entire contents of which are incorporated herein by reference.

This application is related to U.S. Pat. No. 7,117,199, issued Oct. 2, 2006 and entitled "Spatially Coding and Displaying Information," the entire contents of which are incorporated herein by reference.

This application is also related to the following applications, filed concurrently herewith, the entire contents of which are incorporated herein by reference:

U.S. patent application Ser. No. 11/834,538, entitled "Systems and Methods for Presenting Results of Geographic Text Searches;"

U.S. patent application Ser. No. 11/834,563, entitled "Systems and Methods for Presenting Results of Geographic Text Searches;"

U.S. patent application Ser. No. 11/834,566, entitled "Systems and Methods for Presenting Results of Geographic Text Searches;"

U.S. patent application Ser. No. 11/834,584, entitled "Systems and Methods for Presenting Results of Geographic Text Searches;"

U.S. patent application Ser. No. 11/834,598, entitled "Systems and Methods for Obtaining and Using Information from Map Images; and"

U.S. patent application Ser. No. 11/834,600, entitled "Systems and Methods for Obtaining and Using Information from Map Images."

TECHNICAL FIELD

This invention relates to computer systems, and more particularly to spatial databases, document databases, search engines, and data visualization.

BACKGROUND

There are many tools available for organizing and accessing documents through different interfaces that help users find information. Some of these tools allow users to search for documents matching specific criteria, such as containing specified keywords. Some of these tools present information about geographic regions or spatial domains, such as driving directions presented on a map.

These tools are available on private computer systems and are sometimes made available over public networks, such as the Internet. Users can use these tools to gather information.

SUMMARY OF THE INVENTION

The invention provides systems and methods for obtaining and using information from map images.

Under one aspect, an interface program stored on a computer-readable medium causes a computer system with a display device to perform the functions of: displaying an image of a region of a metric vector space; obtaining a set of pixel extents in the image that contain apparent textual annotations; for each pixel extent of the set, obtaining a confidence score that the pixel extent actually contains a textual annotation; and displaying the set of pixel extents in a ranked list based on the corresponding confidence scores.

One or more embodiments include one or more of the following features. The program further causes the computer system to perform the functions of, for at least one pixel extent of the set, at least one of automatically generating a text string based on the apparent textual annotation, and accepting user input entering a text string based on the apparent textual annotation. The program further causes the computer system to perform the functions of at least one of accepting user input modifying the text string and accepting user input validating the text string. The program further causes the computer system to perform the functions of storing the pixel extents and the text strings. The pixel extents and text strings are stored in at least one of a gazetteer database and a searchable location-related database. The program further causes the computer system to perform the functions of at least one of accepting user input modifying the confidence scores corresponding to the pixel extents and displaying the confidence scores corresponding to the pixel extents. The program further causes the computer system to perform the functions of obtaining coordinates for a location in the metric vector space depicted by the image and associated with a pixel extent. The program further causes the computer system to perform the functions of storing the pixel extent and the coordinates. The pixel extent and coordinates are stored in at least one of a gazetteer database and a searchable location-related database. The pixel extents include raster label extracts. The image of the region includes a scanned paper map.

Under another aspect, an interface program stored on a computer-readable medium causes a computer system with a display device to perform the functions of: obtaining an image of a region of a metric vector space, wherein the image includes apparent textual annotations; for each apparent textual annotation, obtaining a text string based on that apparent textual annotation; for each text string, determining whether the text string corresponds to a name of a known location in the metric vector space; and if the text string corresponds to the name of the known location: displaying information about the known location; displaying the image of the region; and accepting user input indicating whether the apparent textual annotation actually refers to the known location.

One or more embodiments include one or more of the following features. The program further causes the computer system to perform the functions of, if the user input indicates that the apparent textual annotation actually refers to the known location, creating a ground control point in the image of the region. The information about the known location includes an image of the known location. The program further causes the computer system to perform the functions of, if the user input indicates that the apparent textual annotation actually refers to the known location, accepting user input relating a pixel region in the image of the region to a pixel region in the image of the known location. The program further causes the computer system to perform the functions of, if the user input indicates that the apparent textual annotation actually refers to the known location, executing a projection function on the image of the region that relates the image of the region to the known location. The program further causes the computer system to perform the functions of, after executing the projection function on the image of the region, obtaining location coordinates based on the relationship between the image of the region and the known location, and storing the coordinates and the text string. The image of the region includes a scanned paper map. Obtaining the text string based on the apparent textual annotation includes obtaining a set of pixel extents in the image that contain the apparent textual annotations and, for each pixel extent of the set, at least one of accepting user input entering a text string based on the apparent textual annotation and automatically generating a text string based on the apparent textual annotation.

Under another aspect, a method of obtaining information about an image of a region of a metric vector space includes: displaying an image of a region of a metric vector space; obtaining a set of pixel extents in the image that contain apparent textual annotations; for each pixel extent of the set, obtaining a confidence score that the pixel extent actually contains a textual annotation; and displaying the set of pixel extents in a ranked list based on the corresponding confidence scores.

One or more embodiments include one or more of the following features. For at least one pixel extent of the set, at least one of automatically generating a text string based on the apparent textual annotation, and accepting user input entering a text string based on the apparent textual annotation. Accepting user input modifying the text string and accepting user input validating the text string. Storing the pixel extents and the text strings. The pixel extents and text strings are stored in at least one of a gazetteer database and a searchable location-related database. Accepting user input modifying the confidence scores corresponding to the pixel extents and displaying the confidence scores corresponding to the pixel extents. Obtaining coordinates for a location in the metric vector space depicted by the image and associated with a pixel extent. Storing the pixel extent and the coordinates. The pixel extent and coordinates are stored in at least one of a gazetteer database and a searchable location-related database. The pixel extents include raster label extracts. The image of the region includes a scanned paper map.

Under another aspect, a method of obtaining information about an image of a region of a metric vector space includes: obtaining an image of a region of a metric vector space, wherein the image includes apparent textual annotations; for each apparent textual annotation, obtaining a text string based on that apparent textual annotation; for each text string, determining whether the text string corresponds to a name of a known location in the metric vector space; and if the text string corresponds to the name of the known location: displaying information about the known location; displaying the image of the region; and accepting user input indicating whether the apparent textual annotation actually refers to the known location.

One or more embodiments include one or more of the following features. If the user input indicates that the apparent textual annotation actually refers to the known location, creating a ground control point in the image of the region. The information about the known location includes an image of the known location. If the user input indicates that the apparent textual annotation actually refers to the known location, accepting user input relating a pixel region in the image of the region to a pixel region in the image of the known location. If the user input indicates that the apparent textual annotation actually refers to the known location, executing a projection function on the image of the region that relates the image of the region to the known location. After executing the projection function on the image of the region, obtaining location coordinates based on the relationship between the image of the region and the known location, and storing the coordinates and the text string. The image of the region includes a scanned paper map. Obtaining the text string based on the apparent textual annotation includes obtaining a set of pixel extents in the image that contain the apparent textual annotations and, for each pixel extent of the set, at least one of accepting user input entering a text string based on the apparent textual annotation and automatically generating a text string based on the apparent textual annotation.

Under another aspect, an interface program stored on a computer-readable medium causes a computer system with a display device to perform the functions of: obtaining a text string apparently corresponding to a name of a location; obtaining coordinates for the location; displaying a plurality of text phrases that contain the text string in a plurality of contexts; and accepting user input indicating which text phrases refer to the location.

One or more embodiments include one or more of the following features. The program further causes the computer system to perform the functions of assigning a confidence score to the text string and accepting user input that changes the confidence score. The assigned confidence score includes one of 0 and 1. The program further causes the computer system to perform the functions of displaying an image of the location identified by the coordinates while displaying the plurality of text phrases. Obtaining the text string includes: displaying an image of a region of a metric vector space; obtaining a pixel extent in the image that contains an apparent textual annotations; and accepting user input entering the text string based on the apparent textual annotation. Obtaining the text string includes: obtaining an image of a region of a metric vector space; obtaining a pixel extent in the image that contains an apparent textual annotations; and automatically generating the text string based on the apparent textual annotation. Obtaining coordinates for the location includes: displaying an image of a region of a metric vector space, the region containing the location; accepting user input indicating a target location in the metric vector space, the target location having known coordinates; and using the known coordinates of the target location as coordinates for the location.

Under another aspect, a method of obtaining information about a text string includes: obtaining a text string apparently corresponding to a name of a location; obtaining coordinates for the location; displaying a plurality of text phrases that contain the text string in a plurality of contexts; and accepting user input indicating which text phrases refer to the location.

One or more embodiments include one or more of the following features. Assigning a confidence score to the text string and accepting user input that changes the confidence score. The assigned confidence score includes one of 0 and 1. Displaying an image of the location identified by the coordinates while displaying the plurality of text phrases. Obtaining the text string includes: displaying an image of a region of a metric vector space; obtaining a pixel extent in the image that contains an apparent textual annotations; and accepting user input entering the text string based on the apparent textual annotation. Obtaining the text string includes: obtaining an image of a region of a metric vector space; obtaining a pixel extent in the image that contains an apparent textual annotations; and automatically generating the text string based on the apparent textual annotation. Obtaining coordinates for the location includes: displaying an image of a region of a metric vector space, the region containing the location; accepting user input indicating a target location in the metric vector space, the target location having known coordinates; and using the known coordinates of the target location as coordinates for the location.

Under another aspect, an interface program stored on a computer-readable medium causes a computer system with a display device to perform the functions of: accepting search criteria from a user, the search criteria including a free-text query and a domain identifier, the domain identifier identifying a domain in a metric vector space; in response to accepting the search criteria from the user, obtaining a set of document-location tuples from a corpus of documents, each document-location tuple satisfying the search criteria, and at least one document associated with a document-location tuple includes a location-data file, the location-data file including an image of a metric vector space; displaying on the display device a visual representation of the domain identified by the domain identifier; and displaying a visual indicator based on the image of the metric vector space and overlaying the visual representation of the domain identified by the domain identifier.

One or more embodiments include one or more of the following features. The location-data file further includes vector information relating the metric vector space to a known location. The visual indicator includes a thumbnail of the image of the metric vector space. The visual indicator includes the image of the metric vector space. The visual indicator is aligned with the visual representation of the domain identified by the domain identifier. The visual indicator and the visual representation of the domain both represent a feature, and wherein the visual indicator is additionally warped such that the feature represented by the visual indicator is positioned over the feature represented by the visual representation of the domain. The program further causes the computer system to perform the functions of displaying a plurality of visual indicators representing the document-location tuples. The plurality of visual indicators includes a plurality of icons.

Under another aspect, a method of displaying information about document-location tuples includes: accepting search criteria from a user, the search criteria including a free-text query and a domain identifier, the domain identifier identifying a domain in a metric vector space; in response to accepting the search criteria from the user, obtaining a set of document-location tuples from a corpus of documents, each document-location tuple satisfying the search criteria, and at least one document associated with a document-location tuple includes a location-data file, the location-data file including an image of a metric vector space; displaying a visual representation of the domain identified by the domain identifier; and displaying a visual indicator based on the image of the metric vector space and overlaying the visual representation of the domain identified by the domain identifier.

One or more embodiments include one or more of the following features. The location-data file further includes vector information relating the metric vector space to a known location. The visual indicator includes a thumbnail of the image of the metric vector space. The visual indicator includes the image of the metric vector space. The visual indicator is aligned with the visual representation of the domain identified by the domain identifier. The visual indicator and the visual representation of the domain both represent a feature, and wherein the visual indicator is additionally warped such that the feature represented by the visual indicator is positioned over the feature represented by the visual representation of the domain. Displaying a plurality of visual indicators representing the document-location tuples. The plurality of visual indicators includes a plurality of icons.

The details of one or more embodiments of the invention are set forth in the accompanying drawings and the description below. Other features, objects, and advantages of the invention will be apparent from the description and drawings, and from the claims.

DEFINITIONS

For clarity, we define several terms of art:

"Data" is any media object that can be represented by numbers, such as numbers in base two, which are called "binary numbers."

"Information" is data that a human or machine or a machine can interpret as having meaning.

"Metadata" is information about other information. For example, a document is a media object containing information and possibly also metadata about the information. For example, if a document contains text by an author named "Dave," then the document may also contain metadata identifying Dave as the author. Metadata often performs the function of "identifying" part of a media object. The metadata usually identifies part of a media object in order to provide additional information about that part of the media object. The mechanism for identifying part of a media object usually depends on the format and specific composition of a given media object. For text documents, character ranges are often used to identify substrings of the text. These substrings are media objects.

A "media object" is any physical or electronic object that can be interpreted as containing information, thoughts, or emotions. Thus, a media object is a broad class of things, including such diverse objects as living organisms, paper documents, rocks, videos, email messages, web pages, slide show presentations, spreadsheets, renderings of equations, and music.

A "digital media object" is a media object constructed from binary electronic signals or similar computing-machine oriented signals. Frequently, media objects can be stored in digital form, and this digital form can be replicated and transmitted to different computer systems many separate times.

A "document" is a media object containing information composed by humans for the purpose of transmission or archiving for other humans. Documents are typically the targets of the queries issued by users to search systems. Examples of documents include text-based computer files, as well as files that are partially text-based, files containing spatial information, and computer entities that can be accessed via a document-like interface. Documents can contain other documents and may have other interfaces besides their document-like interfaces. Every document has an address. In the case of world-wide web documents, this address is commonly a URL. The documents exist on computer systems arrayed across a computer network, such as a private network or the Internet. The documents may be hyperlinked, that is, may contain references (hyperlinks) to an address of another document. Copies of the documents may be stored in a repository.

A "digital document" is a document that is a digital media object, such as a file stored in a file system or web server or digital document repository.

A "text document" is a document containing character symbols that humans can interpret as signifying meaning. A "digital text document" is a text document that is also a digital document. Typically, digital text documents contain character symbols in standardized character sets that many computer systems can interpret and render visually to users.

Digital text documents may also contain other pieces of information besides text, such as images, graphs, numbers, binary data, and other signals. Some digital documents contain images of text, and a digital representation of the text may be separated from the digital document containing the images of text.

A "corpus of documents" is a collection of one or more documents. Typically, a corpus of documents is grouped together by a process or some human-chosen convention, such as a web crawler gathering documents from a set of web sites and grouping them together into a set of documents; such a set is a corpus. The plural of corpus is corpora.

A "subcorpus" is a corpus that is fully contained within a larger corpus of documents. A subcorpus is simply another name for a subset of a corpus.

A "summary" is a media object that contains information about some other media object. By definition, a summary does not contain all of the information of the other media object, and it can contain additional information that is not obviously present in the other media object.

An "integrated summary" is a set of summaries about the same media object. For example, a web site about a book typically has several summaries organized in different ways and in different mediums, although they are all about the same book. An integrated summary can include both sub-media objects excerpted from the media object summarized by the integrated summary, and also summary media objects.

To "summarize" is to provide information in the form of a media object that is a selection of less than all of the information in a second media object possibly with the addition of information not contained in the second media object. A summary may simply be one or more excerpts of a subset of the media object itself. For example, a text search engine often generates textual summaries by combining a set of excerpted text from a document. A summary may be one or more sub-strings of a text document connected together into a human-readable string with ellipses and visual highlighting added to assist users reading the summary. For example, a query for "cars" might cause the search engine to provide a search result listing containing a list item with the textual summary " . . . highway accidents often involve <b>cars</b> that . . . dangerous pileups involving more than 20 <b>cars</b> . . . ." In this example, the original media object contained the strings "highway accidents often involve cars that" and "dangerous pileups involving more than 20 cars", and the summary creation process added the strings " . . . " and "<b>" and "</b>" to make it easier for users to read the concatenated strings. These substrings from a document and represented to a user are an example of a "fragment" of a media object.

A "statistically interesting phrase" or "SIP" is a substring of a text that is identified as interesting. Often, the method of determining which phrases are interesting is an automated or semi-automated process that relies on statistical information gathered from corpora of documents. For example, one way of identifying SIPs is to statistically assess which phrases are relatively common in a given text but relatively uncommon in a reference corpus. This determines interestingness of phrases in the text relative to the statistical background of the reference corpus. For example, the phrase "tree farm" may occur twice in a document containing a hundred pairs of words. That means it has a relative frequency of about 1%. Meanwhile, the phrase "tree farm" might only occur ten times in a reference corpus containing ten million pairs of words, i.e. one in a million chance of randomly choosing that pair of words out of all the pairs.

Since one-in-one-hundred is much larger than one-in-one-million, the phrase "tree farm" stands out against the statistical backdrop of the reference corpus. By computing the ratio of these two frequencies, one obtains a likelihood ratio. By comparing the likelihood ratios of all the phrases in a document, a system can find statistically interesting phrases. One notices that simply because of finite size effects, that the smallest possible frequency of occurrence for a phrase in a short text is certain to be much larger than the frequencies of many phrases in a large reference corpus. This observation underscores the importance of comparing likelihood ratios, rather than treating each such score as containing much independent meaning of its own. Nonetheless, likelihood ratio comparisons are one effective way of identifying SIPs.

A "sub-media object" is a media object that is part of a second media object. For example, a chapter in a book is a sub-media object of the book, and a paragraph in that chapter is a sub-media object of the chapter. A pixel in a digital image is a sub-media object of the digital image. A sub-media object is any fragment of a larger media object. For example, a fragment of a document might be an image of a portion of the document, such is commonly done with digital scans of paper documents. A fragment of a text document might be a string of symbols contained in the text document and represented to a user. Since digital media objects can be replicated ad infinitum, a sub-media object of a digital media object can accurately reproduce any portion of the original media object without necessarily becoming a sub-summary.

A "sub-summary" is summary of a sub-media object. A summary may simply be a set of one or more sub-media objects excerpted from the original media object. The word "sub-summary" is defined here for clarity: a summary of a sub-media object is just as much a summary as other types of summaries, however in relation to a "containing summary" about a larger fragment of the original work, a sub-summary describes a smaller part than the containing summary that summarizes the larger fragment.

A "metric space" is a mathematical conceptual entity defined as follows: a metric space is a set of elements possibly infinite in number and a function that maps any two elements to the real numbers with the following properties. A metric on a set X is a function (called the distance function or simply distance)

$$d: X \times X \to R$$

(where R is the set of real numbers). For all x, y, z in X, this function is required to satisfy the following conditions:
1. $d(x, y) \geq 0$ (non-negativity)
2. $d(x, y) = 0$ if and only if $x = y$ (identity of indiscernibles)
3. $d(x, y) = d(y, x)$ (symmetry)
4. $d(x, z) \leq d(x, y) + d(y, z)$ (subadditivity/triangle inequality).

A "vector space" is a mathematical conceptual entity with the following properties: Let F be a field (such as the real numbers or complex numbers), whose elements will be called scalars. A vector space over the field F is a set V together with two binary operations:

vector addition: $V \times V \to V$ denoted $v+w$, where $v, w \in V$, and scalar multiplication: $F \times V \to V$ denoted $a v$, where $a \in F$ and $v \in V$, satisfying the axioms below. Four require vector addition to be an Abelian group, and two are distributive laws.

1. Vector addition is associative: For all $u, v, w \in V$, we have $u+(v+w)=(u+v)+w$.

2. Vector addition is commutative: For all v, w∈V, we have v+w=w+v.

3. Vector addition has an identity element: There exists an element 0∈V, called the zero vector, such that v+0=v for all v∈V.

4. Vector addition has an inverse element: For all v∈V, there exists an element w∈V, called the additive inverse of v, such that v+w=0.

5. Distributivity holds for scalar multiplication over vector addition: For all a∈F and v, w∈V, we have a (v+w)=a v+a w.

6. Distributivity holds for scalar multiplication over field addition: For all a, b∈F and v∈V, we have (a+b) v=a v+b v.

7. Scalar multiplication is compatible with multiplication in the field of scalars: For all a, b∈F and v∈V, we have a (b v)=(ab) v.

8. Scalar multiplication has an identity element: For all v∈V, we have 1 v=v, where 1 denotes the multiplicative identity in F.

Formally, these are the axioms for a module, so a vector space may be concisely described as a module over a field.

A "metric vector space" is a mathematical conceptual entity with the properties of both a vector space and a metric space.

The "dimension" of a vector space is the number of vectors in the equivalence class of basis vectors that minimally span the vector space.

A "line segment" is a geometric entity in a metric space defined by two entities in the metric space. These two entities are referred to as the "ends" of the line segment. The line segment is the two ends plus the concept of a shortest path connecting them, where the path length is determined by the metric on the metric space.

A "domain" is an arbitrary subset of a metric space. Examples of domains include a line segment in a metric space, a polygon in a metric vector space, and a non-connected set of points and polygons in a metric vector space.

A "domain identifier" is any mechanism for specifying a domain. For example, a list of points forming a bounding box or a polygon is a type of domain identifier. A map image is another type of domain identifier. In principle, a name for a place can constitute a domain identifier, but this is a less common type of domain identifier, because it lacks the explicit representation of dimensionality that a map image has.

A "sub-domain" is a domain which is a subset of another domain. For example, if one is considering a domain that is a polygon, then an example of a sub-domain of that domain is a line segment or subset of line segments selected from the set of line segments that make up the polygon.

A "point" is an entity in a metric vector space. It can be defined by a set of coordinates in a coordinate system describing the space. A point has zero volume, area, and length. Entities in a vector space are often called "features," so a "point feature" is a location defined simply by a single point. One often uses "centroid points" (also known as "centroid coordinates") to simplify the description of more complicated entities, such as polygons. A centroid can be computed by finding the average value of each of the multiple coordinates used in defining the many points that make up a feature. This is also called the "center of mass" point. There can be different averaging techniques that generate somewhat different centroid coordinates. The key point of centroid coordinates is to identify a representative point for a geometric entity in a metric vector space.

A "polyline" is an ordered set of entities in a metric space. Each adjacent pair of entities in the list is said to be "connected" by a line segment.

A "polygon" is a polyline with the additional property that it implicitly includes a line segment between the last element in the list and first element in the list.

A "polyhedron" is a set of polygons with some of the line segments inherent in the underlying polylines are associated with line segments from other polygons in the set. A "closed" polyhedron is a polyhedron in a metric vector space and every line segment is associated with a sufficient number of other line segments in the set that one can identify an interior domain and an exterior domain such that any line segment connecting an element of the interior domain to an element of the exterior domain is guaranteed to intersect a polygon in the set.

A "bounding box" is a right-angled polyhedron that contains a particular region of space. Its "box" nature is based on the polyhedron's square corners. It is a "bounding" nature is based on its being the minimum such shape that contains the region of interest. A bounding box is a common way of specifying a domain of interest, because it is technically easy to implement systems that display, transmit, and allow navigation of right-angled display elements—especially in two dimensions.

A "spatial domain" is a domain in a metric vector space.

A "coordinate system" is any means of referring to locations within a spatial domain. For example, a so-called Cartesian coordinate system on a real-valued metric vector space is a tuple of real numbers measuring distances along a chosen set of basis vectors that span the space. Many examples of coordinate systems exist. "Unprojected latitude-longitude" coordinates on a planet, like Earth, are an example of two-dimensional spherical coordinates on a sphere embedded in three-dimensional space. A "datum" is a set of reference points from which distances are measured in a specified coordinate system. For example, the World Grid System 1984 (WGS84) is commonly used because the Global Position System (GPS) uses WGS84 as the defining datum for the coordinates that it provides. For coordinate systems used to describe geographic domains, one often speaks of "projected" coordinate systems, which are coordinates that can be related to unprojected latitude-longitude via mathematical functions and procedures called "projection functions." Other types of coordinate systems use grids to divide a particular domain into subdomains, e.g. the Military Grid Reference System (MGRS) divides the Earth into subdomains labeled with letters and numbers. Natural language references to places are a coordinate system in the general sense that people often recognize a phrase like "Cambridge" as meaning a place, but there may be many such places. Such ambiguity is typically not tolerated in the design of coordinate systems, so an important part of constructing location-related content is coping with such ambiguity, either by removing it or describing it or simply stating that it exists.

A "physical domain" is a spatial domain that has a one-to-one and onto association with locations in the physical world in which people could exist. For example, a physical domain could be a subset of points within a vector space that describes the positions of objects in a building. An example of a spatial domain that is not a physical domain is a subset of points within a vector space that describes the positions of genes along a strand of DNA that is frequently observed in a particular species. Such an abstract spatial domain can be described by a map image using a distance metric that counts the DNA base pairs between the genes. An abstract space, humans could not exist in this space, so it is not a physical domain.

A "geographic domain" is a physical domain associated with the planet Earth. For example, a map image of the London subway system depicts a geographic domain, and a CAD diagram of wall outlets in a building on Earth is a geographic domain. Traditional geographic map images, such as those drawn by Magellan depict geographic domains.

A "location" is a spatial domain. Spatial domains can contain other spatial domains. A spatial domain that contains a second spatial domain can be said to encompass the second spatial domain. Since some spatial domains are large or not precisely defined, any degree of overlap between the encompassing spatial domain and the encompassed location is considered "encompassing." Since a spatial domain is a set of elements from a metric vector space, the word "encompassing" means that the logical intersection of the sets of elements represented by the two spatial domains in question is itself a non-empty set of elements. Often, "encompassing" means that all of the elements in the second spatial domain are also elements in the encompassing domain. For example, a polygon describing the city of Cambridge is a location in the spatial domain typically used to represent the state of Massachusetts. Similarly, a three-dimensional polyhedron describing a building in Cambridge is a location in the spatial domain defined by the polygon of Cambridge. The word "location" is a common parlance synonym for a "spatial domain."

"Proximate locations" are locations that are closer together than other locations. Closeness is a broad concept. The general notion of closeness is captured by requiring that proximate locations be contained within a circle with a radius less the distance between other locations not considered proximate. Any distance metric can be used to determine the proximity of two results. A plurality of proximate locations is a set of locations that have the spatial relationship of being close together.

The "volume" of a domain is a measure of the quantity of space contained inside the domain. The volume is measured by the metric along each of the dimensions of the space, so the units of volume of the units of the metric raised to the dimension of the space, i.e. $L^d$. For one-dimensional spaces, domains have volume measured simply by length. For two-dimensional spaces, domains have volume measured by area, that is, length squared.

A domain can be viewed as a list of points the space. A domain is said to "contain" a point if the point is in the list. The list may be infinite or even innumerable. A domain is said to "contain" another domain if 100% of the other domains's points are contained in the domain. A domain is said to "partially contain" another domain if more than 0% but less than 100% % of the other domain's points are contained in the domain.

A "location reference" is a sub-media object of a document that a human can interpret as referring to a location. For example, a sub-string of a document may be "Cambridge, Mass.," which a human can interpret as referring to an entity with representative coordinates longitude-latitude coordinates (−71.1061, 42.375). As another example, a location reference may be the name of an organization, such as "the Administration," which in some contexts means the US Presidential Administration and its main offices at the White House in Washington, D.C.

Two locations are said to be "co-referenced" if a single document contains location references to both locations.

A "candidate location reference" is a submedia object identified in a media object, where the submedia object may refer to a location. Typically, a candidate location reference is identified by a set of metadata that also includes a confidence score indicating the likelihood that the identified submedia object actually refers to the location.

A "multi-dimensional map" is a map representing a domain with more than one dimension.

A "statistical property" is a piece of metadata about a piece of information generated by analyzing the information using statistical techniques, such as averaging or comparing the information to averages gathered from reference information. For example, a document has information in it that can be statistically analyzed by comparing the frequency of occurrence of consecutive pairs of words in the document to the frequency of occurrence of those pairs in a reference corpus of documents. The resulting statistical property is a ratio of frequencies. Other statistical properties exist. Statistical properties are often used to distinguish a subset of information from a larger set of information. For example, given a set of documents, one might analyze them to compute a statistical property that differentiates a subset of those documents as being more relevant to a user's query. As another example, a system may analyze information in a media object to decide how likely it is that it refers to a particular location. The result confidence score is a statistical property of the document-location tuple, and it can be used to distinguish it relative to other document-location tuples.

A "document-location tuple" is a two-item set of information containing a reference to a document (also known as an "address" for the document) and a domain identifier that identifies a location.

A "geospatial reference" is a location reference to a location within a geographic domain.

"Location-related content" is information that can be interpreted as identifying or referring to a location within a spatial domain. Location-related content can be associated with a media object in many ways. For example, location-related content may be contained inside the media object itself as location references, such as names of places, explicit latitude-longitude coordinates, identification numbers of objects or facilities or buildings. For another example, location-related content may be associated with a media object by a system that associates a reference to a media object with location-related content that is separate from the media object itself. Such a system might be a database containing a table with a URL field and a latitude-longitude field in a table. To obtain location-related content associated with a media object, a person or computer program might pass the media object to a geoparsing engine to extract location-related content contained inside the media object, or it might utilize a system that maintains associations between references to media objects and location-related content. The fact that a creator of a media object once lived in a particular place is a piece of location-related content associated with the media object. Other examples of such auxiliary location-related content are the locations of physical copies of the media object and locations of people interested in the media object.

A "sub-media object that is not a location-related content" is a sub-media object that is not a location reference. For example, a fragment of a text document that says "Eat great pizza in" is not location-related content even though the subsequent string may be a location reference.

A "spatial relationship" is information that can be interpreted as identifying or referring to a geometric arrangement, ordering, or other pattern associated with a set of locations. For example, "the aliens traveled from Qidmore Downs to Estheral Hill," describes a spatial relationship that organizes the location references "Qidmore Downs" and "Estheral Hill" into an ordering. Another name for a spatial relationship is a geometric relationship.

A "reference to a media object" is a means of identifying a media object without necessarily providing the media object itself. For example, a URL is a reference to a media object. For another example, media object title, author, and other bibliographic information that permits unique identification of the media object is a reference to that media object.

A "graph" is a set of items (often called "nodes") with a set of associations (often called "links") between the items. A "weighted graph" is a graph in which the associations carry a numerical value, which might indicate the distance between the items in the set when embedded in a particular space. A "direct" graph is a graph in which the associations have a defined direction from one item to the other item.

A "cycle" is a subset of links in a graph that form a closed loop. A cycle in a directed graph must have all the links pointing in one direction around the loop, so that it can be traversed without going against the direction of the associations. An "acycle graph" is a graph that contains no cycles.

A "directed acyclic graph" is a graph with directed links and no cycles. A "hierarchy" is a name for a directed acyclic graph. "DAG" is another name for a direct acyclic graph. One type of DAG relevant to our work here is a DAG constructed from partial containment of geometric entities in a space. Since a geometric entity can overlap multiple other areas, the graph of relationships between them is usually not a tree. In principle, a network of partial containment relationships is not even a DAG because cycles can emerge from sets of multiply overlapping locations. Nonetheless, one can usually remove these cycles by making judgment calls about which locations ought to be considered parent nodes for a particular purpose. For example, a DAG could be constructed from the states of New England, the region known as New England, and the region known as the "New England seaboard." If a data curator decides that New England is the parent node for all the states and all the states are parent nodes to the New England seaboard, then a three level DAG has been constructed. The curator could have made another organization of the relationships.

A "tree" is a directed acyclic graph in which every node has only one parent.

A "general graph" is just a graph without any special properties identified.

An "image" is a media object composed of a two-dimensional or three-dimensional array of pixels that a human can visually observe. An image is a multi-dimensional representation of information. The information could come from a great variety of sources and may describe a wide range of phenomena. Pixels may be black/white, various shades of gray, or colored. Often a three-dimensional pixel is called a "voxel." An image may be animated, which effectively introduces a fourth dimension. An animated image can be presented to a human as a sequence of two- or three-dimensional images. A three-dimensional image can be presented to a human using a variety of techniques, such as a projection from three-dimensions into two-dimensions or a hologram or a physical sculpture. Typically, computers present two-dimensional images on computer monitors, however, some human-computer interfaces present three-dimensional images. Since an image is a multi-dimensional representation of information, it implies the existence of a metric on the information. Even if the original information appears to not have a metric, by representing the information in an image, the process of creating the image gives the information a metric. The metric can be deduced by counting the number of pixels separating any two pixels in the image. If the image is animated, then the distance between pixels in two separate time slices includes a component from the duration of time that elapses between showing the two time slices to the human. Typically, a Euclidean metric is used to measure the distance between pixels in an image, however other metrics may be used. Since images can be interpreted as having a metric for measuring the distance between pixels, they are representations of domains. Typically, images are representations of spatial domains. An image of a spatial domain that is associated with the planet Earth is typically called a "geographic map." An image of another spatial domain may also be called a "map," but it is a map of a different type of space. For example, an image showing the fictional location known as "Middle Earth" described in the novels by Tolkien is a type of map, however the locations and domains displayed in such a map are not locations on planet Earth. Similarly, one may view images showing locations on the planet Mars, or locations in stores in the city of Paris, or locations of network hubs in the metric space defined by the distances between router connections on the Internet, or locations of organs in the anatomy of the fish known as a Large-Mouth Bass. An image depicting a spatial domain allows a person to observe the spatial relationships between locations, such as which locations are contained within others and which are adjacent to each other. A subset of pixels inside of an image is also an image. Call such a subset of pixels a "sub-image". In addition to simply depicting the relationships between locations, an image may also show conceptual relationships between entities in the metric space and other entities that are not part of that metric space. For example, an image might indicate which people own which buildings by showing the locations of buildings arranged in their relative positions within a domain of a geographic metric space and also showing sub-images that depict faces of people who own those buildings. Other sub-images may be textual labels or iconography that evokes recognition in the human viewer.

A "map image" is an image in which one or more sub-images depict locations from a spatial domain. A "geographic map image" is a map image in which the spatial domain is a geographic space. Map images are also called "raster graphics" because like a television image they consist of an array of pixels that are either on or off, or showing varying levels of color or grayness.

"Scale" is the ratio constructed from dividing the physical distance in a map image by the metric distance that it represents in the actual domain. A "high scale" image is one in which the depiction in the map image is closer to the actual size than a "low scale" image. The act of "zooming in" is a request for a map image of higher scale; the act of "zooming out" is a request for a map image of lower scale.

A "search engine" is a computer program that accepts a request from a human or from another computer program and responding with a list of references to media objects that the search engine deems relevant to the request. Another name for a request to search engine is "search query" or simply a "query." Common examples of search engines include: free-text search engines that display lists of text fragments from media objects known as "web pages;" image search engines that accept free-text or other types of queries from users and present sets of summaries of images, also known as "image thumbnails;" commerce sites that allow users to navigate amongst a selection of product categories and attributes to retrieve listings of products; and online book stores that allow users to input search criteria in order to find books that match their interests. Frequently, a result set from a book search engine will contain just one result with several different types of summaries about the one book presented in the result list of length one. Related books are often described on pages that are accessible via a hyperlink; clicking such a hyperlink constructs a new query to the book search engine, which responds by generating a new page describing the new set of results requested by the user.

A "search result listing" is the list of references provided by a search engine.

A "search user" is a person using a search engine.

A "text search engine" is a search engine that accepts character symbols as input and responds with a search result listing of references to text documents.

A "string" is a list of characters chosen from some set symbols (an alphabet) or other means of encoding information. A "free text string" is a string generated by a human by typing, speaking, or some other means of interacting with a digital device. Typically, the string is intended to represent words that might be found in a dictionary or in other media objects. However, the point of the "free" designator is that the user can enter whatever characters they like without necessarily knowing that they have been combined that way ever before. That is, by entering a free text string, a user is creating a new string.

A "free text query" is a search engine query based on a free text string input by a user. While a free text query be used as an exact filter on a corpus of documents, it is common to break the string of the free text query into multiple substrings that are matched against the strings of text in the documents. For example, if the user's query is "car bombs" a document that mentions both ("car" and "bombs") or both ("automobile" and "bomb") can be said to be responsive to the user's query. The textual proximity of the words in the document may influence the relevance score assigned to the document. Removing the letter "s" at the end of "bombs" to make a root word "bomb" is called stemming.

A "geographic search engine" or "geographic text search engine" or "location-related search engine" or "GTS" is a search engine that provides location-based search user interfaces and tools for finding information about places using free-text query and domain identifiers as input, for example as described in U.S. Pat. No. 7,117,199. A GTS generally produces a list of document-location tuples as output. A GTS produces document-location tuples in response to search criteria including a free-text query and a domain identifier identifying a domain in a metric vector space, such as a bounding box of a domain or a name of a location in the space. A GTS engine uses a relevance function to assign relevance scores to documents in a corpus of documents and location references in the documents. The resulting relevance scores allow the GTS to sort the document-location tuples that satisfy the search criteria and present the highest ranked tuples to the user.

A "user interface" is a visual presentation to a person. A "search user interface" is a user interface presented to a search user by a search engine.

A "display area" is a visual portion of a user interface. For example, in an HTML web page, a DIV element with CSS attributes is often used to specify the position and size of an element that consumes part of the visual space in the user interface.

A "text area" is a display area containing text and possibly other types of visual media.

A "map area" is a display area containing a map image and possibly other types of visual media.

A "graph area" is a display area containing a visual representation of a graph and possibly other types of visual media.

A "variable display element" is a class of display areas that encode a numerical value, such as a relevance score, in a visual attribute. Any instance of a given class of variable display elements can be easily visually compared with other instances of the class. For example, map visual indicators or markers with color varying from faint yellow to blazing hot orange-red can be easily compared. Each step along the color gradient is associated with an underlying numerical value. As another example, a map marker might have variable opacity, such that one end of the spectrum of values is completely transparent and the other extreme of the spectrum is totally opaque. As another example, background colors can be used to highlight text and can be a class of variable display elements using a gradient of colors, such as yellow-to-red.

A "human-computer interface device" is a hardware device that allows a person to experience digital media objects using their biological senses.

A "visual display" is a media object presented on a human-computer interface device that allows a person to see shapes and symbols arranged by the computer. A visual display is an image presented by a computer.

Computer systems often handle "requests" from users. There are many ways that a computer system can "receive a request" from a user. A mouse action or keystroke may constitute a request sent to the computer system. An automatic process may trigger a request to a computer system. When a user loads a page in a web browser, it causes the browser to send a request to one or more web servers, which receive the request and respond by sending content to the browser.

A "visual indicator" is a sub-image inside of a visual display that evokes recognition of a location or spatial relationship represented by the visual display.

A "marker symbol" is a visual indicator comprised of a sub-image positioned on top of the location that it indicates within the spatial domain represented by the visual display.

An "arrow" is a visual indicator comprised of an image that looks like a line segment with one end of the line segment closer to the location indicated by the visual indicator and the other end farther away, where closer and farther away are determined by a metric that describes the visual display.

The word "approximate" is often used to describe properties of a visual display. Since a visual display typically cannot depict every single detailed fact or attribute of entities in a space, it typically leaves out information. This neglect of information leads to the usage of the term approximate and often impacts the visual appearance of information in a visual display. For example, a visual indicator that indicates the location "Cambridge, Mass." in a geographic map image of the United States might simply be a visual indicator or marker symbol positioned on top of some of the pixels that partially cover the location defined by the polygon that defines the boundaries between Cambridge and neighboring towns. The marker symbol might overlap other pixels that are not contained within Cambridge. While this might seem like an error, it is part of the approximate nature of depicting spatial domains.

A "spatial thumbnail" is a visual display of a summary of a media object that presents to a user location-related content or spatial relationships contained in the media object summarized by the spatial thumbnail.

A "digital spatial thumbnail" is a spatial thumbnail comprised of a digital media object that summarizes a second media object, which might be either digital media object or other form of media object.

A "companion map" is a visual display that includes one or more spatial thumbnails and the entire media object summarized by the spatial thumbnail. If a companion map is a sub-summary, then may include only the sub-media object and not the entirety of the larger media object from which the sub-media object is excerpted.

An "article mapper application" is a computer program that provides companion maps for a digital media object.

To "resolve" a location reference is to associate a sub-media object with an entity in a metric space, such as a point in a vector space. For example, to say that the string "Cambridge, Mass." means a place with coordinates (−71.1061, 42.375) is to resolve the meaning of that string.

A "geoparsing engine" is a computer program that accepts digital media objects as input and responds with location-related content extracted from the media object and resolved to entities in a metric space. While the name "geoparsing engine" includes the substring "geo", in principle a geoparsing engine might extract location-related content about locations in non-geographic spatial domains, such as locations within the anatomy of an animal or locations with a metric space describing DNA interactions or protein interactions. Such a system might simply be called a "parsing engine."

A "text geoparsing engine" is a geoparsing engine that accepts digital text documents as input and responds with location-related content extracted from the document and resolved to entities in a metric space.

An "automatic spatial thumbnail" is a spatial thumbnail generated by a geoparsing engine without a human manually extracting and resolving all of the location references of the media object summarized by the spatial thumbnail. An automatic spatial thumbnail might be semi-automatic in the sense that a human might edit portions of the spatial thumbnail after the geoparsing engine generates an initial version. The geoparsing engine may operate by generating so-called "geotags," which are one type of location-related content that uses SGML, XML, or another type of computer-readable format to describe locations and spatial relationships in a spatial domain, such as a geographic domain. See U.S. Pat. No. 7,117,199 for more information on geotags.

An "automatic spatial thumbnail of a text document" is an automatic spatial thumbnail generated by a text geoparsing engine in response to a digital text document.

An "integrated spatial thumbnail" is an integrated summary that includes as one or more spatial thumbnails. An integrated spatial thumbnail may include sub-media objects excerpted from the media object being summarized, which illustrate location references that relate to the location-related content summarized by the spatial thumbnail. For example, an integrated spatial thumbnail that summarizes a PDF file might show text excerpted from the PDF file and a spatial thumbnail with a geographic map image showing visual indicators on locations described in the PDF's text. For another example, an integrated spatial thumbnail that summarizes a movie might show a text transcript of words spoken by actors in the movie and a spatial thumbnail showing the animated path of two of the movie's protagonists through a labyrinth described in the film.

An "automatic integrated spatial thumbnail" is an integrated spatial thumbnail in which one or more of the spatial thumbnails is an automatic spatial thumbnail.

A "representation of location-related content" is a visual display of associated location-related content. Since location-related content describes domains and spatial relationships in a metric space, a representation of that content uses the metric on the metric space to position visual indicators in the visual display, such that a human viewing the visual display can understand the relative positions, distances, and spatial relationships described by the location-related content.

A "web site" is a media object that presents visual displays to people by sending signals over a network like the Internet. Typically, a web site allows users to navigate between various visual displays presented by the web site. To facilitate this process of navigating, web sites provide a variety of "navigation guides" or listings of linkages between pages.

A "web site front page" is a type of navigation guide presented by a web site.

A "numerical score" is a number generated by a computer program based on analysis of a media object. Generally scores are used to compare different media objects. For example, a computer program that analysis images for people's faces might generate a score indicating how likely it is that a given contains an image of a person's face. Given a set of photos with these scores, those with the highest score are more likely to contain faces. Scores are sometimes normalized to range between zero and one, which makes them look like probabilities. Probabilistic scores are useful, because it is often more straightforward to combine multiple probabilistic scores than it is to combine unnormalized scores. Unnormalized scores range over a field of numbers, such as the real numbers, integers, complex numbers, or other numbers.

A "relevance score" is a numerical score that is usually intended to indicate the likelihood that a user will be interested in a particular media object. Often, a relevance score is used to rank documents. For example, a search engine often computes relevance scores for documents or for phrases that are responsive to a user's query. Media objects with higher relevance scores are more likely to be of interest to a user who entered that query.

A "confidence score" is a numerical score that is usually intended to indicate the likelihood that a media object has particular property. For example, a confidence score associated with a candidate location reference identified in a document is a numerical score indicating the likelihood that the author of the document intended the document to have the property that it refers to the candidate location. Confidence scores can be used for many similar purposes; for example, a system that identifies possible threats to a war ship might associate confidence scores with various events identified by metadata coming from sensor arrays, and these confidence scores indicate the likelihood that a given event is in fact a physical threat to the ship.

A "spatial cluster" is a set of locations that have been identified as proximate locations. For example, given a set of locations associated with a set of document-location tuples, one can identify one or more subsets of the locations that are closer to each other than to other locations in the set. Algorithms for detecting spatial clusters come in many flavors. Two popular varieties are k-means and partitioning. The k-means approach attempts to fit a specified number of peaked functions, such as Gaussian bumps, to a set of locations. By adjusting the parameters of the functions using linear regression or another fitting algorithm, one obtains the specified number of clusters. The fitting algorithm generally gives a numerical score indicating the quality of the fit. By adjusting the number of specified locations until a locally maximal fit quality is found, one obtains a set of spatially clustered locations. The partitioning approach divides the space into approximately regions with approximately equal numbers of locations from the set, and then subdivides those regions again. By repeating this process, one eventually defines regions surrounding each location individually. For each region with more than one location, one can compute a minimal bounding box or convex hull for the locations within it, and can then compute the density of locations within that bounding box or convex hull. The density is the number of locations divided by the volume (or area) of the convex hull or bounding box. These densities are numerical scores that can be used to differentiate each subset of locations identified by the partitioning. Subsets with high density scores are spatial clusters. There are many other means of generating spatial clusters. They all capture the idea of finding a subset of locations that are closer to each other than other locations.

A phrase in a text document is said to be "responsive to a free text query" if the words or portions of words in the text are recognizably related to the free text query. For example, a document that mentions "bibliography" is responsive to a query for the string "bib" because "bib" is a commonly used abbreviation for "bibliography". Similarly, a document that mentions "car" is responsive to a query containing the string "cars".

An "annotation" is a piece of descriptive information associated with a media object. For example, a hand-written note in the margin of a book is an annotation. When referring to maps, an annotation is a label that identifies a region or object and describes it with text or other forms of media, such as an image or sound. Map annotation is important to location-related searching, because the search results can be used as annotation on a map.

A "physical domain" is a region of space in the known universe or a class of regions in the known universe. For example, the disk-shaped region between the Earth's orbit and the Sun is a region of space in the known universe that changes in time as our solar system moves with the Milky Way Galaxy. For another example, space inside of a particular model of car are a class of region; any copy of the car has an instance of that class of physical domain.

A "planetary body" is a physical domain of reasonably solid character following a trajectory through the known universe, such as the planet Earth, the planet Mars, the Earth's Moon, the moons of other planets, and also asteroids, comets, stars, and condensing clouds of dust.

A "ranked list" is a sequence of items that has been given an ordering according to a scoring function that provides a score for each item in the list. Typically, the scoring is higher for items earlier in the list. A search result list is such a list, and a relevance function is typically the type of scoring function used to order the list. Each item in the ranked list has a "rank" which is an integer indicating the position in the list. If several items have the same score, then a secondary scoring function may be required to order that subset, or they maybe assigned the same rank or an arbitrary sequence of adjacent ranks.

A "relevance function" is an algorithm, heuristic, procedure, or operation that takes a set of search criteria as input and can then compute a score for any media object. In principle, once initialized with search criteria, a relevance function could be asked to generate a score for any media object. Many media objects may be given a zero-valued score or a null score. Such media objects are called "non-relevant."

A media object is said to "satisfy" a set of search criteria if there exists a relevance function that provides a score other than non-relevant for that media object.

"AJAX" stands for Asynchronous Javascript and XML. DHTML stands for Dynamic HyperText Markup Language. DHTML and AJAX are widely used on the public Web and in private intranets that host web servers. Developers can write DHTML or AJAX documents in textual form so that web servers can send that text to web browser clients that request it from the server. These DHTML/AJAX pages run procedures and functions in the user's web browser. These procedures are written in the javascript programming language. Essentially all modern web browsers are able to interpret and execute javascript. These procedures and functions allow the visual display presented to the human user to include complex visual effects and rapid updating of information from the server. AJAX procedures are widely used to get information from a server without requiring the browser to reload an entire page. Instead of reloading the entire page, the javascript code running in the page causes the browser to retrieve only the needed information from the server. Then, the javascript code inserts that new information into the page so the user can see. This "asynchronous" loading has enabled a new generation of applications on the Web.

A "gazetteer" is a list of names of places, geographic coordinates for the place, and other metadata about the place and/or name. For example, a gazetteer of the State of Massachusetts might have an entry for "Cambridge" and give centroid coordinates for the city of Cambridge, which are 42.375N, 71.10610962W.

A "mapping client" is a piece of software that displays maps. Mapping clients are also called geographic information systems (GIS). Popular mapping clients include ESRI's ArcMap, globe viewers such as Google Earth, and AJAX mapping tools such as OpenLayers. Several AJAX mapping tools are available to knowledge workers in enterprises and on the public Internet. In addition to such AJAX mapping tools, GIS software systems allow other ways of looking at maps. All of these mapping clients provide backdrop maps on which GTS search results can be displayed.

A "GTS Client Plugin" is a software component that allows users to retrieve and display GTS results on top of a particular mapping client. For example, MetaCarta has built a GTS Client Plugin for ESRI's ArcMap. It is a software program that installs on top of ArcMap and provides a user interface that accepts search criteria from users, the search criteria including free text queries from the user and a domain identifier identifying a domain of interest to the user. The GTS Client Plugin displays visual indicators that represent document-locations that are responsive to the query. MetaCarta has built extensions to several mapping clients that allow users to view GTS results on the mapping client.

A "scanned paper map" is a digital image generated from scanning a paper map. The paper map might be a CAD diagram of a building or a map of a city. It could also be a diagram of series of airplanes, which are physical spaces but not geographic spaces, because there are many instances of the airplane each with their own independent metric vector space. Scanned paper maps are important, because so much data has been recorded in paper form and is not yet digitized. While digitizing paper documents and converting the characters to text can be done relatively easily with optical character recognition software, the process of generating digital information from paper maps is more challenging.

After scanning in the map to produce a digital image, it must be aligned with coordinates of the space that it represents (see "rectification" below). Then, to extract information from the map, a person or software system must recognize points, lines, polygons and other features of the map image and create digital "vector data" representing the pixels in the map image. Further, to obtain annotation information, a person or software system must recognize pixels in the map image that represent text and must convert those pixels into digital characters. By digitizing annotation texts that contain place names, one can generate a digital gazetteer of location names that previously had not been available in digital form.

"Rectification" is the process of associating the pixels in a digital map image with points in the space that it represents. One method of rectification is to display an unrectified digital map image and a rectified digital map image, and to allow person to place pairs of markers at corresponding pixels in the two images. The rectified map image is called the "reference" map. The pairs of points in the not-yet rectified map and the reference map are called "ground control points" or "GCPs." Given a sufficient number of GCPs, one can construct an interpolation function that can take pixel coordinates in one map and generate corresponding pixel coordinates in the other map. By definition, the rectified map has a "projection function" that associates its pixel coordinates with coordinates that parameterize the space that it depicts. By composing the two functions, one obtains an interpolation function that takes as input pixel coordinates from the previously unrectified map and generates coordinate points in the depicted space. A "projection function" is more general than an "interpolation function." An interpolation function is a convenient way of generating a projection function, but not the only way. One very common method of rectifying map images, is to use satellite imagery as the reference map, because the process of generating the satellite photograph also generates a projection function that associates the image with the Earth or other planetary body. CAD and facilities management programs also provide means of rectifying images to align with buildings, manufactured parts, equipment (e.g. airplanes) and other physical objects. A map image can be projected to align with a coordinate system that is different from what was originally used to select the display properties of its pixels. After projection, such an image appears "warped" as though it were a rubber sheet. The new warped image has a stretched arrangement of its pixels that allow it to be overlaid on other map images of the same spatial domain. By aligning several images in this way, a system can display various map images as aligned data layers to a user.

"Vector data" is spatial data including one or more points in a coordinate space. Often, vector data is recorded in a coordinate space that can be easily transformed to other coordinate space that may be more appropriate for particular purposes. To facilitate such transformations, a wide variety of projection functions have been developed. In addition to projection functions, in order to interpret a set of vector data one must know the "reference datum" that establishes the origin and coordinate axes used for measuring the coordinates. Such datums are often defined by surveyors recording information about a physical landscape, or by reference points in a CAD diagram of a piece of designed equipment.

"Depicted space coordinates": When a map image depicts a space, it defines a space of its own, which is made up of pixels. The correspondence between the depicted space and the pixel space is represented by one or more projection functions (also known as transformations) that take as input coordinates in one space and generate as output coordinates in the other space. Since computer-based user interfaces only ever show map images of various spaces, one needs a term to refer to the spaces being shown in these images. We use the term "depicted space" to refer to this real or actual space that the computer-based image merely represents. Thus, the phrase "depicted space coordinates" means position parameters defined in a coordinate system in the depicted space as represented by pixel X,Y parameters in one or more images that represent the depicted space.

DESCRIPTION OF DRAWINGS

In the Drawing:

FIG. 6D is a schematic of steps in a method for using text strings from pixel elements in map images as searchable metadata in a GTS search engine according to some embodiments of the invention.

DETAILED DESCRIPTION

Overview

The systems and methods described herein provide enhanced ways of presenting information to users. The systems and methods can be used in concert with a geographic text search (GTS) engine, such as that described in U.S. Pat. No. 7,117,199. However, in general the systems and methods are not limited to use with GTS systems, or even to use with search engines.

Gazetteers are used in many situations, including geoparsing, looking up coordinates for places, and labeling map images. Creating gazetteers is time consuming. By accelerating this process, we make it more likely that people will create larger gazetteers, which helps the many uses of gazetteers. We focus on gazetteer creation techniques that use scanned images of paper maps to find labels on the maps that have not yet been entered into digital gazetteers.

First, a brief overview of an exemplary GTS system, including a subsystem for obtaining and using information from map images, and GUIs running thereon, will be described. Then, the different subsystems and methods will be described in greater detail, in separate sections following the overview. Some embodiments will include only one or some of the subsystems or methods.

U.S. Pat. No. 7,117,199 describes exemplary systems and methods that enable the user, among other things, to pose a query to a geographic text search (GTS) engine via a map interface and/or a free-text query. The query results returned by the geographic text search engine are represented on a map interface as icons. The map and the icons are responsive to further user actions, including changes to the scope of the map, changes to the terms of the query, or closer examination of a subset of results.

Figure 1:
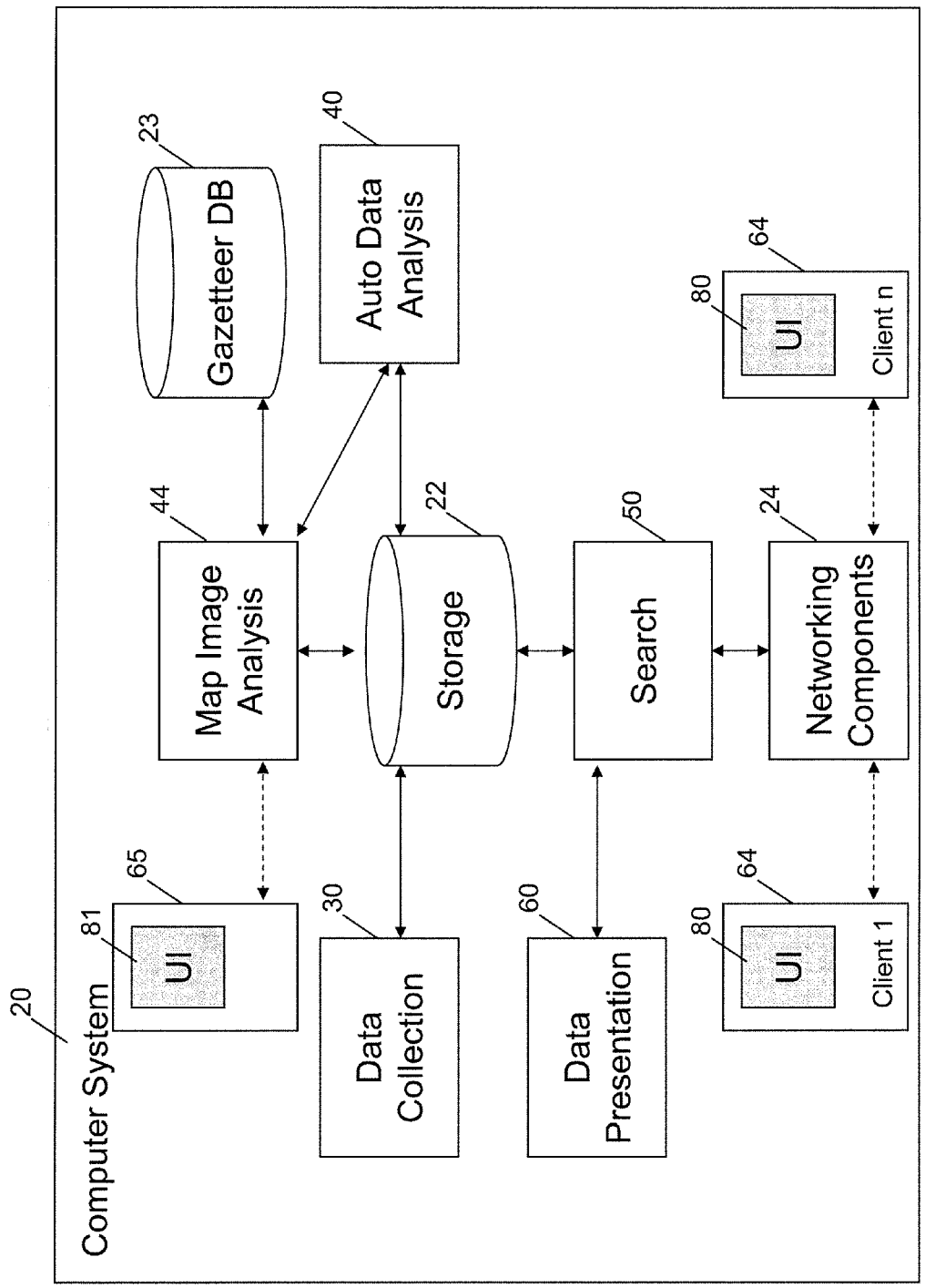
FIG. 1 schematically shows an overall arrangement of a computer system according to some embodiments of the invention.

In general, with reference to FIG. 1, the computer system 20 includes a storage 22 system which contains information in the form of documents, along with location-related information about the documents. The computer system 20 also includes subsystems for data collection 30, automatic data analysis 40, map image analysis 44, search 50, data presentation 60, and a gazetteer database 23. The computer system 20 further includes networking components 24 that allow a GTS user interface 80 to be presented to a user through a client 64 (there can be many of these, so that many users can access the system), which allows the user to execute searches of documents in storage 22, and represents the query results arranged on a map, in addition to other information provided by one or more other subsystems, as described in greater detail below. The computer system 20 further includes components that allow a map analysis user interface 81 to be presented to a user through a client 65, which is in communication with map image analysis subsystem 44. The system can also include other subsystems not shown in FIG. 1.

The data collection 30 subsystem gathers new documents, as described in U.S. Pat. No. 7,117,199. The data collection 30 subsystem includes a crawler, a page queue, and a metasearcher. Briefly, the crawler loads a document over a network, saves it to storage 22, and scans it for hyperlinks. By repeatedly following these hyperlinks, much of a networked system of documents can be discovered and saved to storage 22. The page queue stores document addresses in a database table. The metasearcher performs additional crawling functions. Not all embodiments need include all aspects of data collection subsystem 30. For example, if the corpus of documents to be the target of user queries is saved locally or remotely in storage 22, then data collection subsystem need not include the crawler since the documents need not be discovered but are rather simply provided to the system.

The data analysis 40 subsystem extracts information and meta-information from documents. As described in U.S. Pat. No. 7,117,199, the data analysis 40 subsystem includes, among other things, a spatial recognizer and a spatial coder. As new documents are saved into storage 22, the spatial recognizer opens each document and scans the content, searching for patterns that resemble parts of spatial identifiers, i.e., that appear to include information about locations. One exemplary pattern is a street address. The spatial recognizer then parses the text of the candidate spatial data, compares it to known spatial data, and assigns relevance score to the document. Some documents can have multiple spatial references, in which case reference is treated separately. The spatial coder then associates domain locations with various identifiers in the document content. The spatial coder can also deduce a spatial relevance for terms (words and phrases) that correspond to geographic locations but are not recorded by any existing geocoding services, e.g., infer that the "big apple" frequently refers to New York City. The identified location-related content associated with a document may in some circumstances be referred to as a "GeoTag." Documents and location-related information identified within the documents are saved in storage 22 as "document-location tuples," which are two-item sets of information containing a reference to a document (also known as an "address" for the document) and a metadata that includes a domain identifier identifying a location, as well as other associated metadata such as coordinates of the location.

The search 50 subsystem responds to queries with a set of documents ranked by relevance. The set of documents satisfy both the free-text query and the spatial criteria submitted by the user (more below).

The data presentation 60 subsystem manages the presentation of information to the user as the user issues queries or uses other tools on UI 80.

The map image analysis subsystem 44 is in communication with storage 22, auto data analysis 40, gazetteer database 23, and client 65 on which map image analysis UI 81 is running. As described in greater detail below, map image analysis subsystem 44 analyzes map images (e.g., images obtained by scanning paper maps into a digital format such as .pdf, .jpg or .tiff), and identifies pixel areas that appear to refer to place names. The UI 81 allows a user to efficiently view, validate, and/or modify text strings representing place names associated with the pixel extents. These text strings that can be used for a variety of purposes. For example, the text strings can be used to generate a gazetteer by associating the strings with coordinates derived from the pixel extents, and the resulting information stored in gazetteer database 23. Or, for example, the text strings can be associated with known locations, which allows the known locations to be used as ground control points for the pixel extents. These ground control points can then be used to warp the map image, as described in greater detail below. The warped map image can be stored in storage 22, gazetteer database 23, or elsewhere. Or, for example, the string can be associated with a document containing the map image, e.g., by modifying the document metadata or by modifying a metadata catalog that refers to the document, which is stored in storage 22. Users using the GTS search subsystem 50 can then search this metadata along with other information in storage 22.

Note that the map image analysis subsystem 44 need not be coupled to all, or even any of storage 22, auto data analysis 40, or gazetteer database 23. The map image analysis subsystem 44 is generally suitable for analyzing map images to be used in any context, and is not limited to the exemplary uses described herein.

Figure 2:
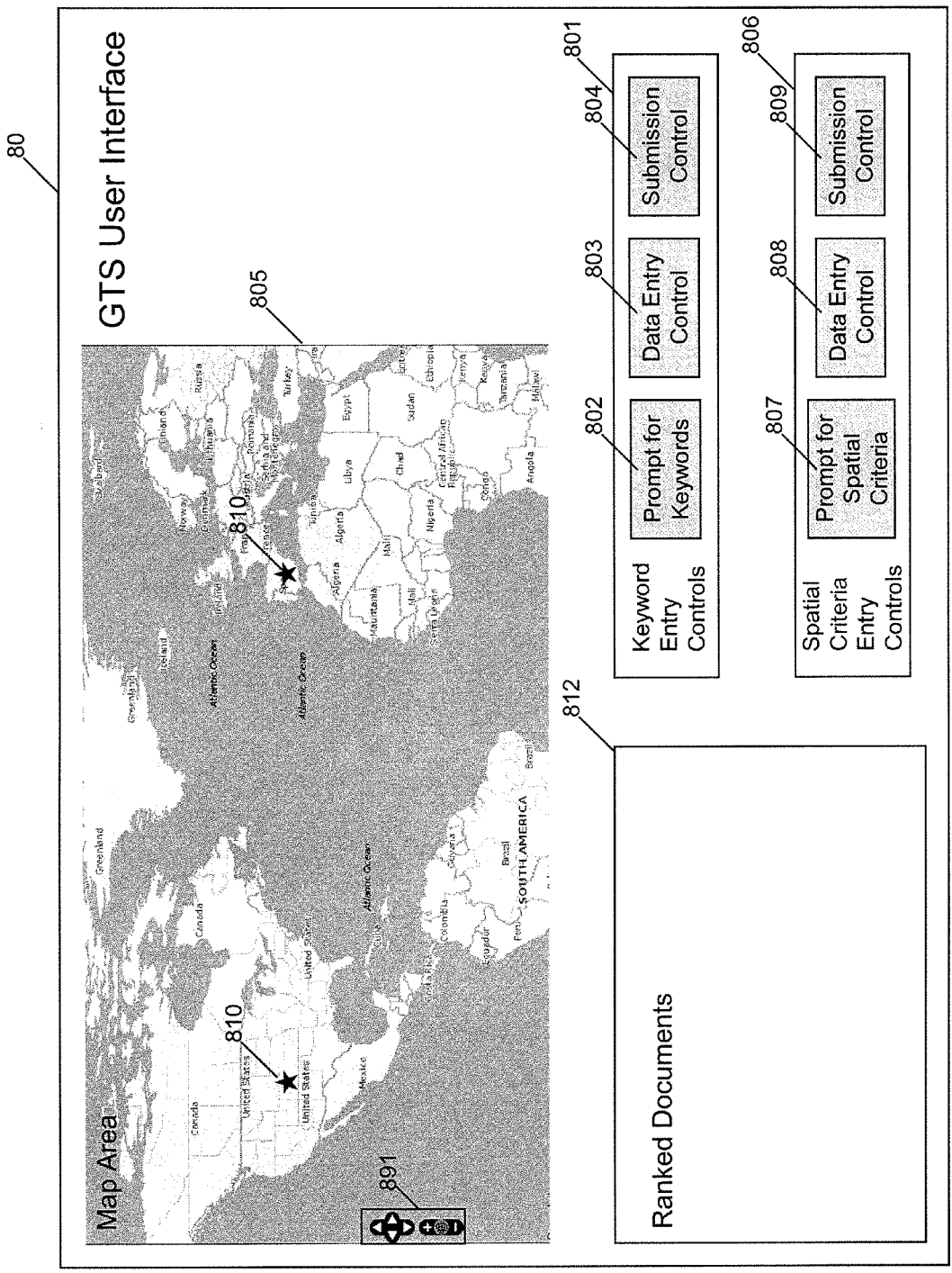
FIG. 2 schematically represents an arrangement of controls on an interface according to some embodiments of the invention.

With reference to FIG. 2, the GTS user interface (UI) 80 is presented to the user on a computing device having an appropriate output device. The UI 80 includes multiple regions for presenting different kinds of information to the user, and accepting different kinds of input from the user. Among other things, the UI 80 includes a keyword entry control area 801, an optional spatial criteria entry control area 806, a map area 805, and a document area 812.

As is common in the art, the UI 80 includes a pointer symbol responsive to the user's manipulation and "clicking" of a pointing device such as a mouse, and is superimposed on the UI 80 contents. In combination with the keyboard, the user can interact with different features of the UI in order to, for example, execute searches, inspect results, or correct results, as described in greater detail below.

Map 805 represents a spatial domain, but need not be a physical domain as noted above in the "Definitions" section. The map 805 uses a scale in representing the domain. The scale indicates what subset of the domain will be displayed in the map 805. The user can adjust the view displayed by the map 805 in several ways, for example by clicking on the view bar 891 to adjust the scale or pan the view of the map.

As described in U.S. Pat. No. 7,117,199, keyword entry control area 801 and spatial criteria control area 806 allow the user to execute queries based on free text strings as well as spatial domain identifiers (e.g., geographical domains of particular interest to the user). Keyword entry control area 801 includes area prompting the user for keyword entry 802, data entry control 803, and submission control 804. Optional spatial criteria entry control area 806 includes area prompting the user for spatial criteria 807, data entry control 808, and submission control 809. The user can also use map 805 as a way of entering spatial criteria by zooming and/or panning to a domain of particular interest, i.e., the extent of the map 805 is also a form of domain identifier. This information is often transmitted as a bounding box defining the extreme values of coordinates displayed in the map, such as minimum latitude and longitude and maximum latitude and longitude.

Examples of keywords include any word of interest to the user, or simply a string pattern. This "free text entry query" allows much more versatile searching than searching by predetermined categories. The computer system 20 attempts to match the query text against text found in all documents in the corpus, and to match the spatial criteria against locations associated with those documents.

After the user has submitted a query, the map interface 80 may use visual indicators 810 to represent documents in storage 22 that satisfy the query criteria to a degree determined by the search 50 process. The display placement of an visual indicator 810 (such as an icon) represents a correlation between its documents and the corresponding domain location. Specifically, for a given visual indicator 810 having a domain location, and for each document associated with the visual indicator 810, the subsystem for data analysis 20 must have determined that the document relates to the domain location. The subsystem for data analysis 20 might determine such a relation from a user's inputting that location for the document. Note that a document can relate to more than one domain location, and thus would be represented by more than one visual indicator 810. Conversely, a given visual indicator may represent many documents that refer to the indicated location. When referring to search results from such a system, we often speak of document-location pairs.

If present, the document area 812 displays a list of documents or document summaries or actual portions of documents to the user.

Extracting Place Names from Map Images

GTS search engines interface with UIs (e.g., GTS search plugins) to present location-related information to users. The information typically contains geographic references extracted and resolved from text document sources. These geographic references are often textual strings that an automated geoparser engine analyzed to produce a probabilistic guess as to the location the author intended, e.g., as described in U.S. Pat. No. 7,117,199. For example, a document that refers to "20 miles north of Jalalabad" would be tagged by the geoparsing engine with coordinates for that location, so that the GTS can plot that location on mapping clients when users request information about that area. The geoparsing uses algorithms and natural language models to guess the location that the author intended. This guess is described by a confidence score (also known as a "geoconfidence" score) generated by the geoparser for each location that it outputs. Higher confidence scores indicate that the algorithms have determined that it is more likely that the author really intended the output location. When this guess is wrong, the user can usually detect the error by reading the text. U.S. patent application Ser. No. 11/818,066, filed Jun. 12, 2007 and entitled "Systems and Methods for Hierarchical Organization and Presentation of Geographic Search Results," the entire contents of which are incorporated herein by reference, describes an interface allowing a user to manually correct geotags.

The capability to extract and resolve text from map images, e.g., place name labels, could also be useful. Raster map images, such as the USGS quad charts frequently used in the U.S., are image files showing a picture of a map. The map might have well-defined geographic features in it, but in this representation, they are only represented by pixels of different color. The map might have textual labels that a human can read, but these labels are not digital text, instead they are simply pixels of various colors. Thus, although information about place names in the map image are readable by a human, this information cannot be readily integrated into searchable databases such as gazetteers, or used to resolve the relationship of the locations shown in the map image to known locations.

Some embodiments use optical character recognition (OCR) or other image analysis tools to recognize pixel areas that appear to be text, and/or guess at the characters that the pixels are intended to represent. This generates a "raster label extract" (RLE) that can eventually be used for a variety of purposes, for example to anchor the image to known coordinates, to compiled into a gazetteer, or to be incorporated into a searchable database, as described in greater detail further below. First, exemplary methods for generating and manipulating RLEs from map images are described.

A simple method of generating RLEs is as follows: First, select a color from the map image which appears to be an color used for displaying textual labels. This selection process can use algorithms such as color quantization to map all the colors in the image into a small color palette, from which the darkest color is selected as the "text color." Second, connected components can be identified amongst the pixels having the text color. Connected components are sets of pixels that neighbor each other. A set of pixels that are contiguous often represent a single entity to the visual eye. For example, a single letter "H" has a set of pixels that form the two vertical lines and a connecting line in the middle. Third, given a set of connected components, an image analysis algorithm can compute the distance between all connected components and group them into sets of connected components that are close together. So, for example, all of the pixels in the each of the five letters in this image of the word "HELLO" might be grouped together because each of the five connected components are close together. Such a process is usually not perfect, because other portions of the map image are not intended to be letters but can be mistaken as being letters by the connected components algorithm. After processing a map with an algorithm such as this, our system has a plurality of sets of pixels, which we call RLEs. Some, or hopefully many of them, will contain a textual label that a human can read and transcribe into the system. Simultaneously, the system attempts to identify other pixels that the textual label is intended to name. The system allows the user to adjust the sets of pixels by including additional pixels or excluding pixels that should not have been included in the RLE or the labeled location.

Figure 6A:
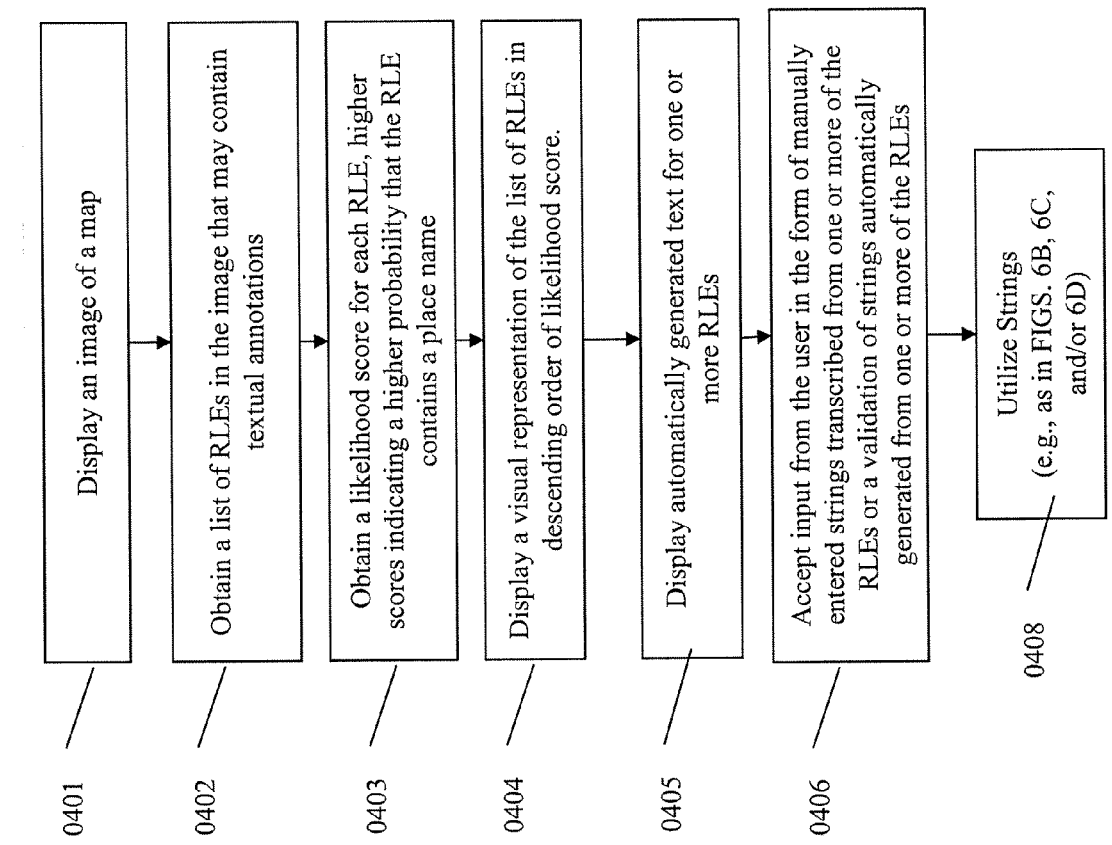
FIG. 6A is a schematic of steps in a method for obtaining text strings from pixel elements in map images according to some embodiments of the invention.

FIG. 6A is a flow chart of steps in an exemplary method for obtaining and manipulating text strings from RLEs from a map image. The method can be executed by logic running on map image analysis subsystem 44 or by user interface program 81 running on client 65 (see FIG. 1), or different parts of the method can be executed by different entities. First, the interface program displays a map image (0401). The program then obtains a list of RLEs that may contain textual annotations, e.g., might be place name labels (0402). To do this, the program uses either image analysis algorithms or allows the user to indicate areas on the image, e.g., using mouse clicks.

Next, the program obtains a confidence score for each RLE (0403). The confidence score represents the program's confidence that the RLE actually contains a textual annotation. The program generates the confidence score, e.g., as metadata associated with various guesses made by the system. In this case, the guess is about whether the creator of the map intended for the pixels indicated by the RLE to contain a label. One way of computing a confidence score is by comparing the width and height of an RLE to the average width and height of a set of RLEs that a human has identified as being labels. This assigns low confidence scores to RLEs that have one or both dimensions much larger or much smaller than a typical label. This is useful for giving low scores to features like long lines that were erroneously extracted as possibly being text labels. There are many other factors and techniques that might be used for computing a confidence score for an RLE. The program presents the list of RLEs to the user in descending order of confidence score (0404), so that the RLEs of which the program is the most confident are presented at the top of the list. The program optionally also automatically generates a text string for one or more of the RLEs (0405), where the text string represents the program's best "guess" as to what characters the RLE may contain.

The program then allows the user to manipulate the presented data (0406). For example, the user can typically readily determine whether a presented RLE actually contains a textual annotation such as a place name. The user can click a button or press a key to indicate to the program whether the RLE is actually a textual annotation; if is not, then the program assigns the pixel extent a confidence score of 0, and skips ahead to the next RLE in the list. If the program generated a text string for a RLE, the user can typically readily determine whether the text string is correct. If the string is correct, the user can click a button or press a key to validate the string, in which case the program assigns the RLE a confidence score of 1 and associates it with the string. If the program did not generate a text string for a RLE, or if the user determines that the text string is incorrect, then the user can enter a new text string or correct the incorrect string. The program then assigns the RLE a confidence score of 1 and associates it with the string.

Figure 6B:
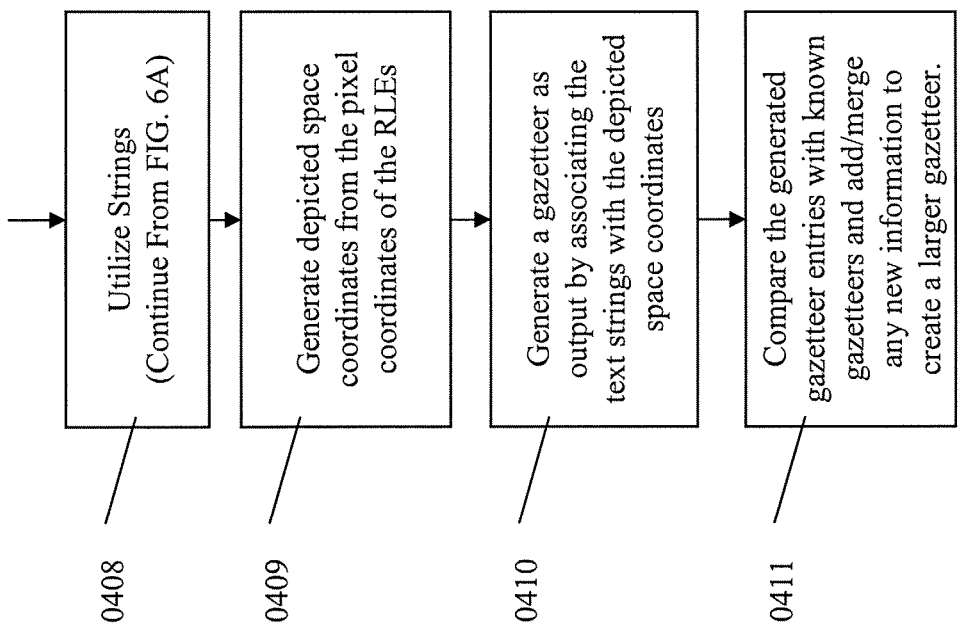
FIG. 6B is a schematic of steps in a method for using text strings from pixel elements in map images to generate a gazetteer according to some embodiments of the invention.

After the user processes the RLEs, the text strings thus generated can be used (0408), for example as described in greater detail below with reference to FIGS. 6B, 6C, and 6D.

As noted above, the OCR and image analysis software typically provide a guess at the characters in an RLE. However, due to limitations in currently available technology, these characters are wrong at least some of the time, especially when the background image clutters the pixels around an RLE. Nonetheless, the guess is typically good enough that its mere existence allows the system to present a list of possible labels to the user. The user interface thus allows users to quickly and efficiently process a large number of RLEs, which can then be used for different purposes.

Figure 3:
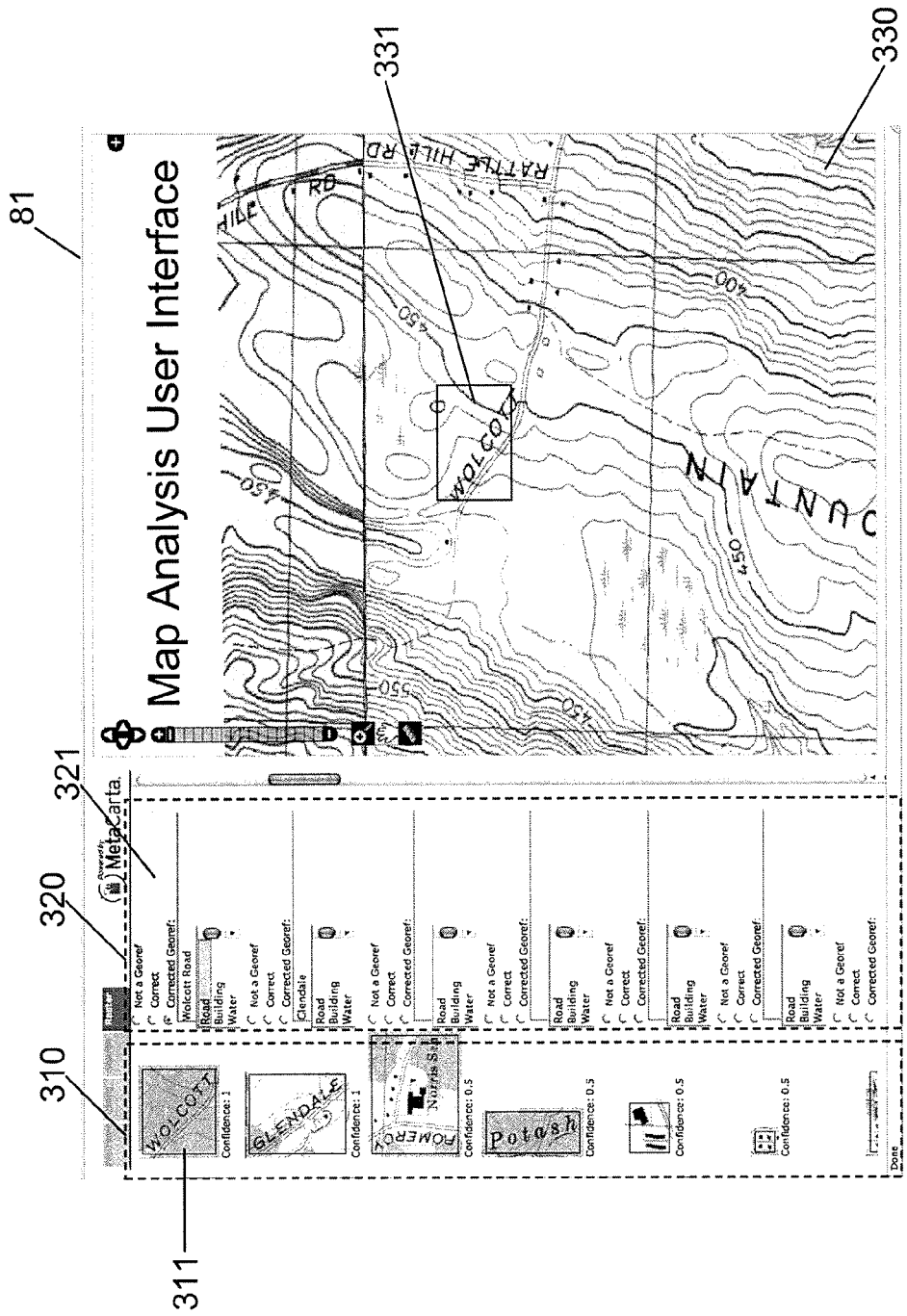
FIG. 3 schematically represents an arrangement of controls on an interface according to some embodiments of the invention.

FIG. 3 shows an exemplary user interface 81 for processing RLEs. The interface includes a list of RLEs that are being processed 310, a set of extraction state controls for each RLE 320, and an overview map 330. The extraction state control 320 for each RLE displays the currently known information about the RLE, such as what text it represents, what type of geographic feature it is, and whether it is or is not a "georef." An RLE is a considered a "georef" if it is not just a textual label but also a proper name of a place, like "Wolcott Road" is the proper name of the road illustrated in this USGS quad chart. The user is able to change the state by clicking on the controls.

For example, the RLE 311 containing the word "WOLCOTT" is active. The interface informs the user that RLE 311 is active by highlighting the corresponding extraction state controls 321. Additionally, a thumbnail image of the RLE is shown in the list and a box 331 is drawn around it in the overview map 330. Below the thumbnail, the word "Confidence:" is followed by a number between 0 and 1 that indicates the probability that this RLE is really textual. The image analysis system computes these probabilities using heuristics and probabilistic models. The confidence scores allow the user interface to sort the RLEs and thus present the RLEs that are most likely to be useful first. This accelerates the human processing the RLEs.

To further accelerate the human processing of RLEs, the user interface does not require any mouse movement, although mouse clicks can also be used. Simple keystrokes have been carefully chosen to allow the user to jump through the states rapidly. Since a user's hands typically rest on the "home keys" of the keyboard, we made the 'j' key mean "this state is correct, jump focus to next RLE." The 'f' key means "this state is wrong, toggle it to the next state." The three default states are "not a georef", "is a georef with correct text," and "is a georef, use the following text." If the user toggles into the third state, the text box below "corrected georef" automatically activates so that their next keystrokes enter letters into that box. When the user hits return it sets the focus on the list of georeference types, such as Road, Building, Water, Town, etc. The user can move through these choices using the arrow keys. When the user hits return, the changes to that RLEs state are saved in a database, and the focus is switched to the next RLE. If the user does not want to process a particular RLE, they can skip it by hitting the 'k' key. Other keystrokes and state information could be used.

RLEs that have been processed are assigned a confidence of 1.0 or 0.0. A confidence of 1.0 means that some user set the state to "is a georef." A confidence of 0.0 means that some user set the state to "not a georef."

The strings are stored or otherwise associated with the map image, e.g., as metadata. The metadata may be associated with the pixel extents in a database, or they maybe associated with small images generated by cutting the pixel extents out of the original map image. In general, it can be fruitful to maintain an association between the original map image, the pixel extent and the labels, because when a new transformation function is generated, e.g., by a user adding GCPs to improve the quality of the transformation, one typically wants to re-generate the depicted space coordinates from the pixel coordinates associated with the RLE. Since the GCPs and transformation are associated with the original map image, and the strings are associated with the RLEs, in some circumstances all three are associated together, so new transformation functions can be used to update the coordinates for the labels.

Various uses for processed RLEs are described in greater detail below.

GeoRectifying Map Images

Often, raster map images are produced by scanning processes that do not capture any explicit geographic information. The scale, projection, and datum of the map are unknown. Before such map images can be displayed with other spatial data about the spaces they depict, it may be desirable to rectify the map. While the process of assigning ground control points (GCPs) to pixels in an image in order to establish a transformation function between an "unknown" image and a known reference image is well known, some embodiments streamline the process in useful new ways. Since the systems and methods deals primarily with images of geographic maps of Earth, the GCPs are typically pixels in the two-dimensional image that represent known coordinate locations in real space on the Earth. For example, an image might show a street corner. A user attempting to rectify the image could make the center pixel of the street intersection a control point, and then get the coordinates for that control point from another map or satellite image or by operating a GPS unit at that street corner. However, images from other planetary bodies (such as Mars or the moon) or from other types of metric vector spaces can also be rectified. For example, CAD diagrams of buildings, parts, equipment, and travel systems can be rectified to align with other maps of these objects.

The rectification user interface presents two map images side by side. One is the unregistered (a.k.a. "unknown") map that the user is processing, and the other is a registered map called the "reference" map. Locations represented by pixels in the reference map can be found by applying a known mathematical function to the pixel X, Y coordinates. To construct a similar mapping for the unknown map, the system allows the user to associate X,Y coordinates in the unknown map to X,Y coordinates in the reference map. There are at least two ways of creating such associations. For example, the user can click in both maps, and the positions of the clicks can be associated. Or, for example, the user can enter strings of characters to name locations in the unknown map in order to retrieve a list of possible known locations with that name. If the user determines that one of the known locations is the one depicted by a portion of the unknown map, then the user can associate that portion of the unknown map with the coordinates of the known location. This associates an X,Y coordinate in the unknown map with a location in the underlying "depicted space" that bot the reference map and unknown map purport to illustrate. One way of helping the user enter text strings associated with portions of the unknown map is to show the user RLEs obtained from the RLE analysis of FIG. 6A to allow the user to use the RLEs to establish names of places. By looking up these names of places in a known gazetteer, the user can quickly identify coordinates for places depicted in the unknown map and use them to create GCPs for the unknown map.

Figure 6C:
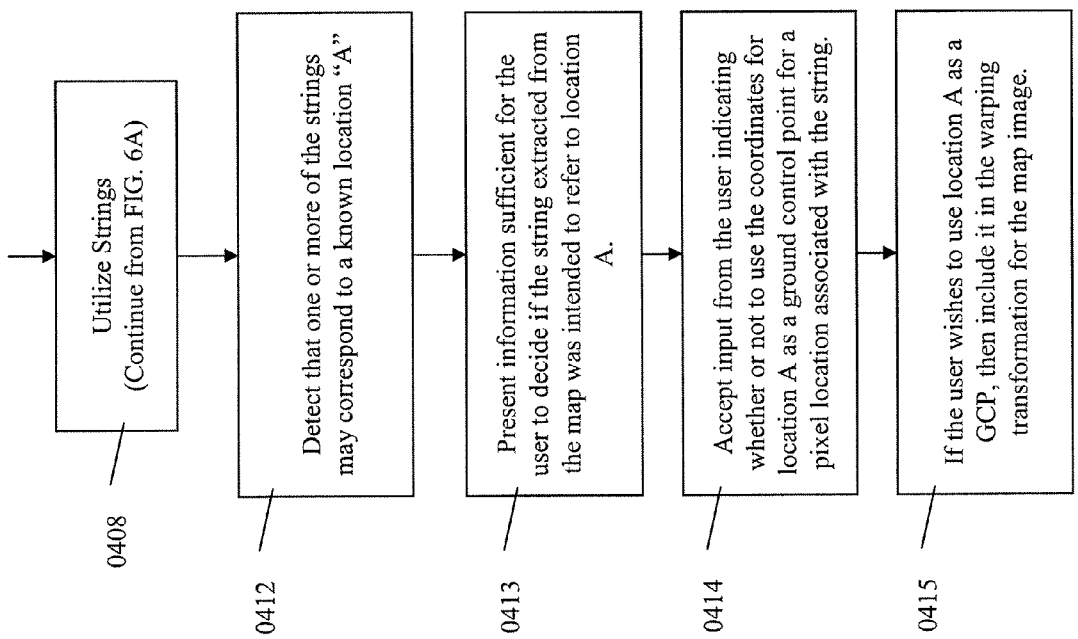
FIG. 6C is a schematic of steps in a method for using text strings from pixel elements in map images to rectify the map according to some embodiments of the invention.
Figure 7:
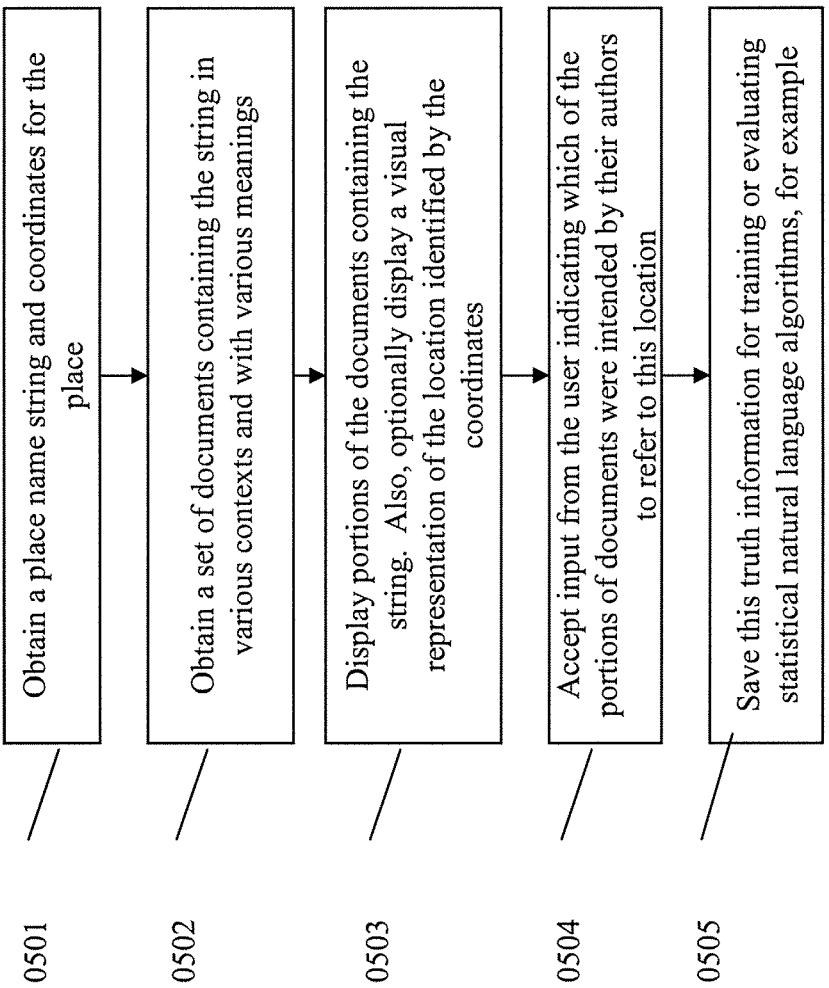
FIG. 7 is a schematic of steps in a method for rapidly truthing place names according to some embodiments of the invention.

FIG. 6C is a flow chart of steps in a method for using text strings associated with RLEs (e.g., as generated in FIG. 6A) to rectify an unknown map. The method can be executed by logic running on map image analysis subsystem 44 or by user interface program 81 running on client 65 (see FIG. 1), or different parts of the method can be executed by different entities. First, the program detects whether one or more of the text strings (which are either automatically generated or entered or corrected by the user at 0405 and 0406 in FIG. 6A) may correspond to a known location "A" (0412). Then, if the text string is the name of a place that is already known to the system, e.g. from a gazetteer, then the system presents the location information to the user (0413), e.g., by zooming the reference map to location "A". This allows the user to determine whether the string was actually intended to refer to location "A".

If the user decides that the location indicated on the reference map is the same location that the author of the unknown map intended to represent by the pixels in or around the RLE, then the user can accept this association as a GCP for the unknown map (0414). The system allows the user to simply hit return or mouse click to create the new GCP. The system then automatically jumps to the next RLE in the confidence ordered list. If the system lands on an RLE that the user does not recognize or is not a location, the user can skip over it to the next one simply by not entering a name and hitting return.

The user can also click in the unknown map to begin creating a set of vector data in the pixel coordinate space of the map image (not shown). This vector data could be a point, line, polyline, polygon, or similar vector data. When the user does this, the system responds as if there had been an RLE at that location and performs the steps of allowing the user to enter a textual label for the location. If the user created a point feature, then they can also identify coordinates for that point in the depicted space. By identifying a matching point in the depicted space, the user creates a GCP. If the user wishes not to enter any name of a place for the location clicked in the map, then he can simply click in the reference map to create the second point needed complete the pair of points in the GCP.

After the user selects or creates a GCP, e.g., for location "A", then the system includes the GCP in the warping transformation for the map image (0415). Generally, at least three GCPs are needed in order to establish sufficient information (e.g., origin, rotation, and X-Y scaling) to use standard cartographic functions to construct of a mathematical function for transforming the X,Y pixel coordinates of the previously-unknown map into latitude, longitude coordinates on the Earth. This function interpolates between the control points to estimate coordinates for any pixel in the image.

The user interface described above makes the process of rectification efficient in many ways. For example, by putting the rectification interface in a web browser, we allow users to rapidly absorb new rasters into their workflow without switching applications. Many knowledge workers are focused on textual information and thus already spend time in a web browser. By allowing these users to perform the process of map rectification and label extraction without using a heavy-duty desktop mapping application, we can accelerate the creation of gazetteers. The interface also allows users to zoom in on control points in the unknown and/or reference map images as far as they would like, even into scales greater than one, so they can more precisely locate the control point in the pixel space and the geographic space. Additionally, users can use the interface to plot existing gazetteer locations and other named locations on the "unknown" map interface in order to check the quality of the rectification as they add more control points. For example, when looking at a raster map of Cambridgeport, a neighborhood in Cambridge, the user is able to enter a street address into a form field and have its mailstop coordinates plotted as a point on both the reference map and the unknown map. When plotting it on the unknown map, the system uses the control points that have been created so far. If the point does not appear to be in the right location in the image, the user can add more control points to improve the interpolation function.

The coordinates are stored or otherwise associated with the previously unknown map (which is now rectified and thus "known"), e.g., as metadata.

Often, the user identifies a label that has ambiguous meaning, such as "China Town," which is the name of many places. Since the system knows of many possible locations associated with the string, it shows a list to the user. The list includes sufficient metadata to differentiate the various locations. This additional information is called "disambiguation" information and consists of things like containing regions (e.g. city, state, country) and feature type (e.g. school, park, town). The user can select the appropriate location from the list or enter a new one if it does not already exist in the list. By selecting a known location, the user associates the location in the unknown map with coordinates known for the selected location.

Constructing Gazetteers

RLEs and their corresponding text strings and coordinates, which can be generated using the methods of FIGS. 6A and 6C, for example, can be used to construct a gazetteer. A gazetteer is a list of location names and their coordinates or geometric descriptions. For example, the city of London, UK could be an entry in a gazetteer, and associated with it in the gazetteer would be either the center coordinates of the city, or a polygon of the cities perimeter, or some other geometric representation of the entity.

Extracting location names from images of maps is a powerful way to build gazetteers. This might seem surprising because one might presume that the names in most maps are already available in gazetteers. However, it turns out that many old maps have simply been scanned and only some of the textual labels in them have been gathered into gazetteers. Before digital gazetteers existed, many map makers also made books with names of places as an index or organizing system for cataloging their maps. Many of these books have been digitized to create digital gazetteers. Also, paper maps can be visually inspected to identify labels that had not yet been put into non-digital gazetteers. People often speak of "handjamming" a gazetteer, meaning manually typing labels into a list while reading a paper map. This same process can be done for digital map images. Both digital and non-digital map images can be very time consuming to visually inspect. The process is also error prone. For example, the U.S. Geological Survey has maintained detailed maps and a gazetteer of the United States for many years. In recent years, they have been digitized. However, the process of extracting all the labels from the map images is still incomplete. For example, in some USGS maps, we found that more than 60% of the names had not yet been entered into the USGS gazetteer. We hope that by accelerating this process, we help people improve the depth of gazetteers like this one.

The user interfaces and methods described above can be modified in order to allow the user to rapidly process RLEs in order to build a gazetteer. FIG. 6B is a flow chart of a method for building a gazetteer using the strings from FIG. 6A (0408). Coordinates in the depicted space are generated by applying a rectification function to pixel coordinates associated with the RLE (described more fully below) (0409). A list of names and places is generated by associating the text strings with coordinates derived from the RLEs (0410). The transformation function may be derived, e.g., using the rectification process described above. These name+coordinate pairs can be compared to existing gazetteers. If they provide new information, it can be merged to created a larger gazetteer (0411).

When the image analysis algorithms fail to find an RLE or fail to construct an accurate coordinate or polygon for the feature labeled by the RLE, the user interface allows the user to draw the shape of a feature in the map and enter a text string to name it. In some embodiments, the image analysis algorithm will identify both a set of pixels containing a label and also a set of pixels that depict the location or geometric feature named by the label. For example, if a town is depicted by a dot near the label containing the name of the town, then ideally, the system would identify the dot as well as the label. A human can also do this by clicking on the dot and drawing a box around the label and associating the two. If the feature is an extended object, like a line or polygon, the user can click multiple times to identify the vertices of the feature. If neither the image analyzer nor the human identify pixels depicting the location itself, then the system can derive approximate coordinates from the pixel extent of the label. For example, the centroid or average coordinate of the RLE pixels can be used as a representative point for the labeled feature itself. In some situations, if an RLE is defined by a polygon with a set of vertices, it is easier to take one of the vertices as being a representative point for the feature being labeled.

As the user processes sets of RLEs or creates new RLEs, the system stores the new gazetteer information in a database, so that it can be used by other systems. To make sure that the information in the database is not unintentionally duplicated, the system shows the user other gazetteer data that has already been gathered. If the user sees that an existing gazetteer name does not have the most accurate geometric information, they can improve it. For example, a name might be associated only with a point, and the user could draw a polygon in the user interface and store this enhanced geographic and geometric information in the gazetteer database.

As users create new gazetteer data, the system can also push that new data into the geoparser subsystem's database of location information. The geoparser uses its natural language statistical models to decide when to tag a piece of text with a particular location. By expanding the information available to the geoparser, we help the system recognize more locations referenced in text. In turn, this provides users with more GTS results.

Including Searchable Map Images in a GTS Database

The GTS system allows users to search through several types of documents including both location-data files and text documents. Location-data files include both vector and raster data. Some location data files are location data files containing information about locations on planetary bodies, like Earth. Raster image documents typically have some text associated with them as metadata, either in the file name or in metadata headers embedded in the file or in associated files. As described in greater detail above, a user might generate textual metadata for a raster file by entering text for RLEs in the image, and once a raster map document has been rectified, it can be warped and displayed in most mapping clients. The textual metadata associated with a raster image document might also contain coordinates that can be plotted in a mapping client.

Other types of location-data files include explicit coordinates, such as GML ("Geographic Markup Language") or KML ("Keyhole Markup Language") or "shapefile" files. Our system identifies both coordinate information and textual information in these files, so that they can be searched using both a domain identifier and a free-text query as input.

Building better gazetteer data can improve geographic text search by enabling geoparsing of more location references in text. Conversely, geographic text search can help build better gazetteers by helping people find map images faster. Map images are often contained inside of documents. For example, PDF files, Microsoft Word files, PowerPoint files, GeoTIFF files, MrSID files, TIFF files and other flat file documents often contain images of scanned paper maps. When such a document is retrieved by a GTS-style search, the visual indicator indicating the location can be more than just a marker icon—it can be an image derived from the map image itself. For example, a GeoTIFF may contain textual metadata or have a file name that is responsive to a user's free-text query, and may have location references or geographic metadata that locates it within the domain identified by a domain identifier input by a user, and thus is a candidate for display to a user as a GTS-style search result. Instead of simply displaying an icon at the location within the domain, our system generates a warped image from the GeoTIFF's image and displays that warped image aligned with the visual display of the domain. This allows the user to see at least some of the pixel information contained within the GeoTIFF, so they can decide if they would like to explore it more completely by zooming in on the image to see more of the pixels. A GeoTIFF typically contains geographic metadata that allows it to be rubber sheeted (or "warped") to align with images of the Earth. By "aligned with" we mean that the various pixels in the warped image sit on top of corresponding pixels depicting the same locations in the map image displayed along with the warped image. Typically, the warped image appears to sit on top of the image of the domain. In some displays, the warped image can be made partially transparent to allow the user to see both sets of pixels simultaneously. Map images stored in other flat file formats may not have this information readily available, in which case our system shows a thumbnail of the map floating above the approximate location within the domain. We call such displays "overlaying and not aligned" because the thumbnail is positioned in approximately the correct position, but is not yet rotated or stretched to properly align its pixels with the underlying base map's pixels. The user can then decide if they are interested in the subject matter of the map image, and if so, they can create GCPs to generate a warping transformation that aligns the map image with the coordinates used to display the domain. By showing an image of the map image found on the display of the domain, we help the GTS search user find information faster.

Figure 8:
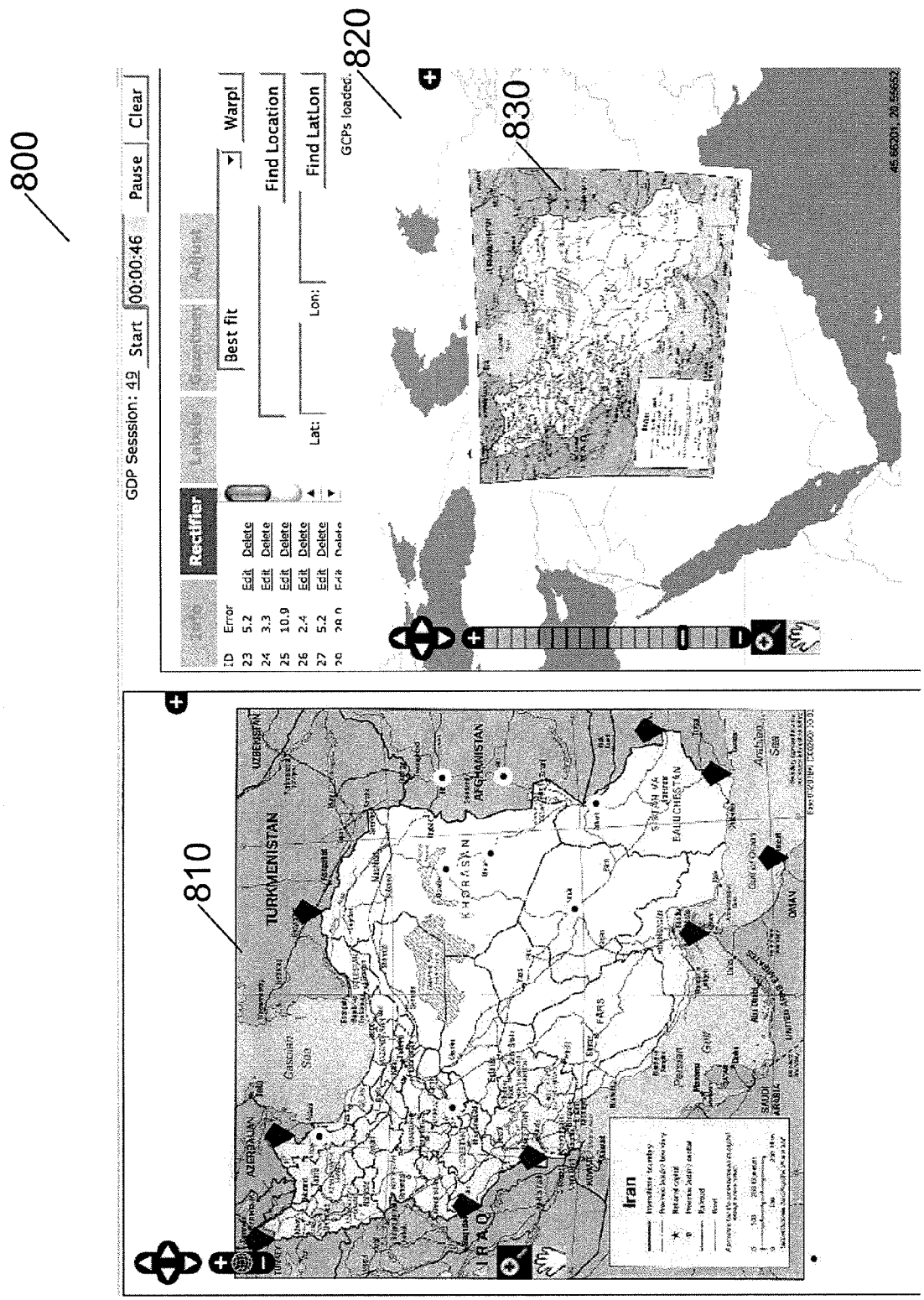
FIG. 8 schematically represents an arrangement of controls on an interface according to some embodiments of the invention.

FIG. 8 is an illustration of an exemplary user interface 800 that shows a warped map image that is aligned with an image of a domain. Map area 810 shows an image of a map of Iran, showing several diamond-shaped markers where the user defined GCPs. Rectification area 820 shows a "rubber-sheeted" image 830 of the map of Iran, which has been warped and aligned to overlay an image of the domain, here an image of the Middle East. The warped image and the image of the domain show common features (e.g., the Caspian Sea), and the common features shown in the warped image approximately aligned with and overlay the same features in the image of the domain. The alignment and stretching are determined in part by projection functions, as described in greater detail herein.

By helping users find both raster graphics documents, vector data documents, and text documents in the same system, we increase the amount and types of information available to users.

The metadata used for determining whether a document meets the user's query criteria may be generated by the processes described herein for associating GCPs and labels with a map image. This metadata may be stored in the image document itself, in associated files, such as a GeoTIFF world file (.tfw), or in a metadata catalog that maintains a pointer or address linking to the file.

FIG. 6D illustrates steps in a method for making location data files, such as map images for which RLEs and text strings have been generated, available for GTS searches. First, the string is associated with a document containing the map image (0416). This association may be through metadata, or a metadata catalog that refers to the document. The document may be the map image, or the map image may be part of a document with more content (which may itself be searchable).

Users are then allowed to search for documents using free-text queries and/or domain identifiers to filter the documents, including documents containing the map image (0417). For example, referring to FIG. 1, the document may be included in storage 22 and thus searchable via search subsystem 50. If the domain identified by the bounding box of the user's map (805) overlaps the extent of the map image, then it is a candidate for inclusion in the GTS result set.

Figure 4:
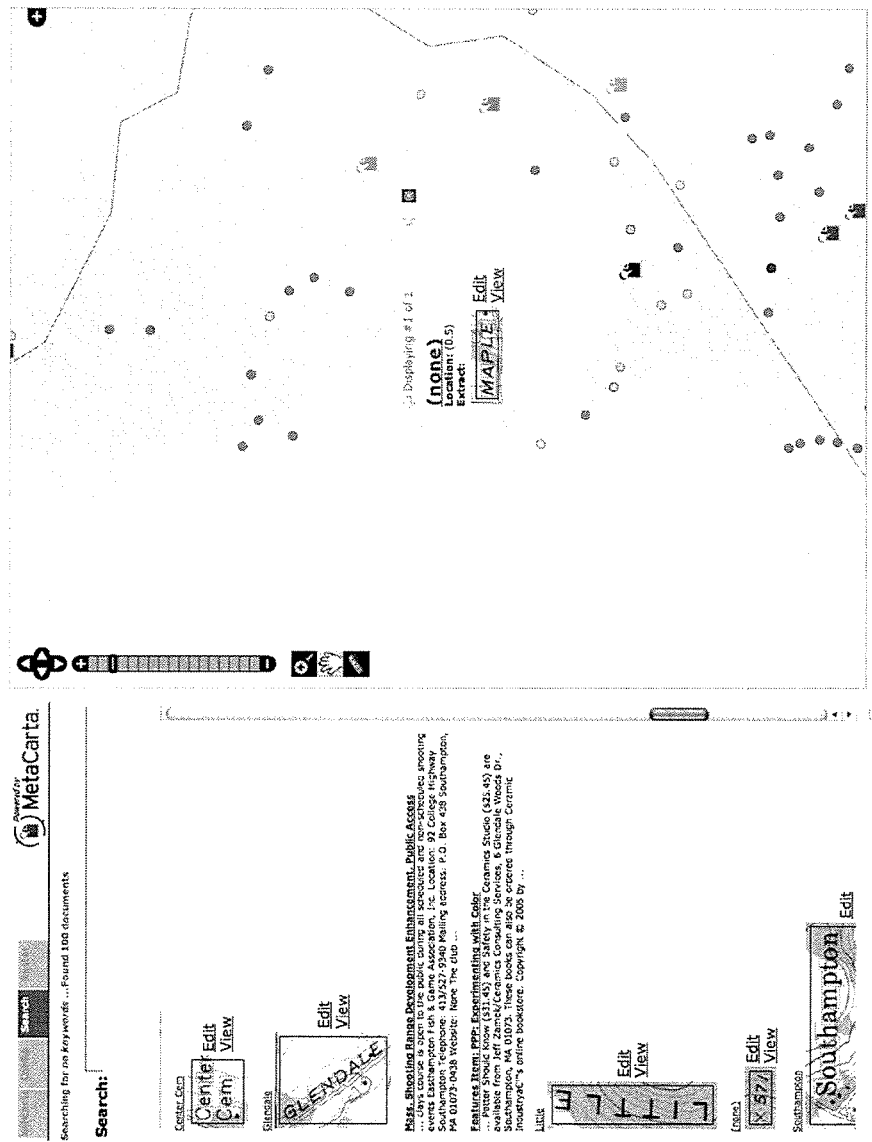
FIG. 4 schematically represents an arrangement of controls on an interface according to some embodiments of the invention.

The interface illustrated in FIG. 4 shows a list of search hits for a particular geographic extent (i.e., the query contained a domain identifier but not a free-text query). In this example, the user has clicked on a marker in the map to generate a popup containing an RLE associated with that marker.

Figure 5:
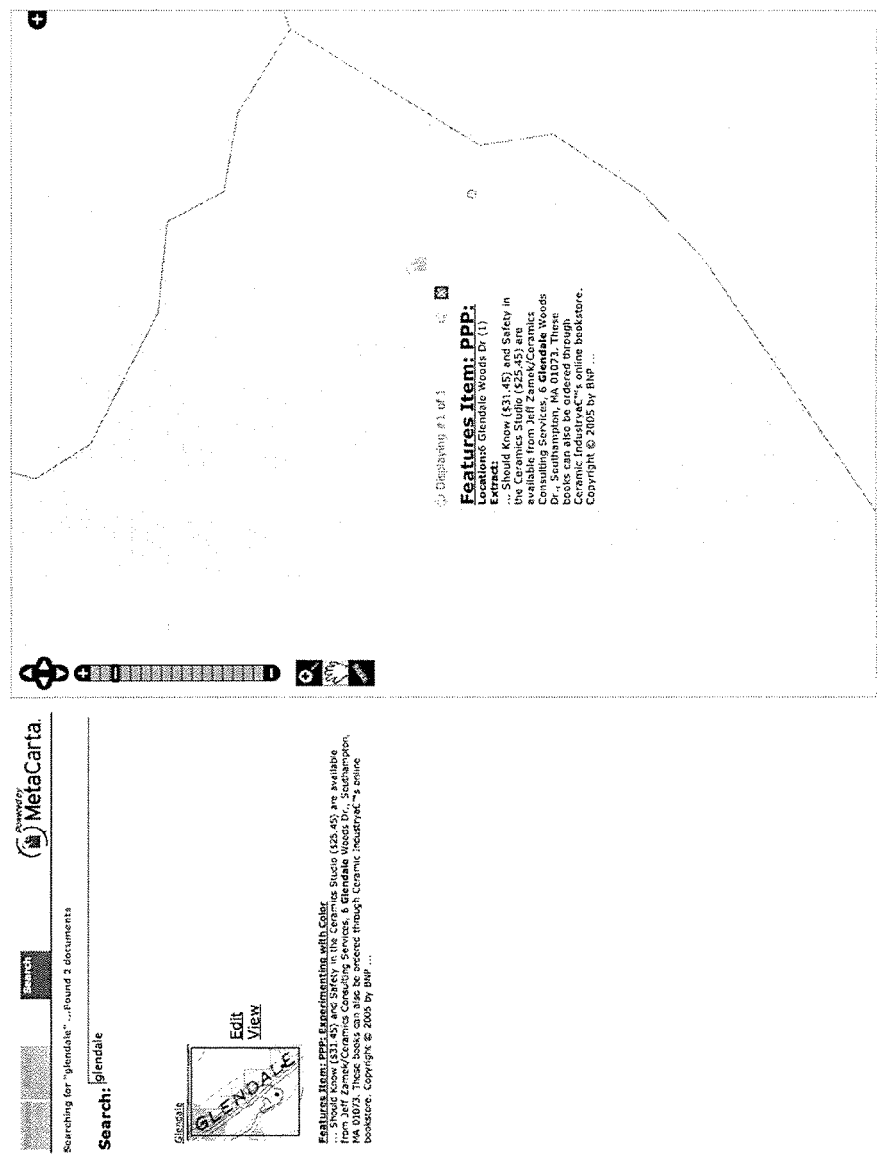
FIG. 5 schematically represents an arrangement of controls on an interface according to some embodiments of the invention.

The interface illustrated in FIG. 5 shows a list of search hits for a particular geographic extent and a keyword search of "Glendale." In this example, both a document and a map have appeared in the search listing.

In another form of this user interface, the RLE thumbnail image itself is displayed in the map instead of a red or yellow circular marker. By plotting part of the raster map in the display, the user can be shown more information.

Truthing Place Names

As noted above, a GTS system typically utilizes a geoparser engine. However, the geoparser engine can make mistakes when tagging a document. When the geoparser makes a mistake on a particular location reference, that mistake can come in several forms. For example, the geoparser might have tagged a string of text that it was not actually intended to be a place. Or, it might have failed to tag a string of text that had been intended to refer to a place. Or, it might have tagged a location reference with coordinates for a different than what the author had intended.

The geoparser uses statistical machine learning models to assess the meaning of strings in text. These statistical machine learning models depend on manually truthed data in order to accumulate statistical patterns of text written by humans. To improve the quality of the geoparser, a "single geoname truth builder" (SGTB) has been developed. The SGTB accepts as input a string of characters that is thought to at least in some contexts refers to a place, and in response it generates a list of examples of that string in various contexts.

A conventional search engine performs the search for documents containing the example string. The documents could come from a private corpus or from the Web, and simply contain the string of characters that were entered. No attempt is made to find documents that use the string of characters to mean any particular thing. Thus, the resulting documents may contain the string in a context that means a place or in a context that means something else that is not a place.

The SGTB takes these documents and constructs short examples of the geoname string in the context in which they were found. For example, the name "Washington" might have examples of that string in contexts where the author meant "President George Washington" and others where the author meant "Washington State" and others where the author meant "Washington D.C." By presenting these examples to human users, our system aids in the rapid construction of a truth set for that name.

More specifically, the system shows a human user the various examples. If a geoparser indicates that a particular example is a location, then the system indicates that to the user. The user can then quickly step through the examples and indicate whether each example is either not a reference to a place or is. If it is, then the user further indicates which location in a vector space the human believes that the author intended. For example, if the human believes the author intended a place depicted in a map image visible in the display, the user can click that location in the map image or can click a button indicating approval of a visual indicator that indicates that location. By providing the geoparser's analysis of each example, the system allows the human to quickly choose the geoparser's answer if it is correct.

The human thus generates metadata about the examples. This process of generating metadata is called "truthing," because the person creates a set of information that codifies the real intent of the authors of the examples. This metadata can then be treated as either a training or a testing set for a geoparser engine. By incorporating linguistic statistics from the examples into the data used by the geoparser, its performance can be improved.

FIG. 5 illustrates steps in a method of generating truth information for a place name string. The method can be executed by logic running on map image analysis subsystem 44 or by user interface program 81 running on client 65 (see FIG. 1), or different parts of the method can be executed by different entities. First, the program obtains a place name string and coordinates for that string (0501). The string can be obtained, for example, from an automatic system, such a queue of errors flagged by manual taggers, from a person entering a string, or using methods described further above, e.g., as illustrated in FIG. 6A. The coordinates for that place can be obtained, for example, by looking it up in a gazetteer, by allowing a user to zoom a map to that place, or using methods described further above, e.g., as illustrated in FIG. 6C.

Then, the program obtains a set of documents that contain the string of characters of the place name or closely related strings, such as spelling variations or stemming variants (0502). These documents are typically gathered through a text search engine. Then, the program displays portions of these documents to a user (0503), and optionally also displays a visual representation of the location identified by the coordinates. The program then accepts input from the user indicating which of the document portions he believes were intended by their authors to refer to the place (0504). This provides a set of examples of different contexts in which the string has different meanings, some of them meaning the location and others meaning something different. This information can then be used to calibrate or evaluate the statistical or heuristic models used in natural language processing systems (0505).

The user interface for the system is similar to the screenshot in FIG. 5. The system sets the state of the examples and allows the user to hit a single keystroke to either save the state as correct and jump to the next, or toggle the state of the current example.

A SGTB can be part of a system that a helps users extract labels from map images, so that as people generate more gazetteer data they also generate linguistic statistics for the new names. This process works as follows: for each location name that a person enters or validates in the map label extraction system, the software uses a SGTB to generate a generates a list of examples of that location name string in various contexts. If any examples exist, the system shows them to the user. The user can then truth these examples, so that the resulting gazetteer data also has linguistic statistics associated with it.

Community Interactions

Manually gathering information from raster images can be time consuming and expensive. Even using semi-automated methods such as those described herein, building up a large gazetteer can be a large task. For many collections of raster images, there are far more location labels than can be practically processed by humans. Thus, targeting RLE processing for particular goals can help to concentrate efforts in useful places. Typically, an organization's raster map data depicts locations of importance to the organizations current field activities and operations. Typically, some of the raster maps are more important than others. Figuring out which maps and which RLEs should be processed next can itself be challenging and time consuming. The systems and methods described above can be modified to help users decide which RLEs to process next by showing them additional sets of data.

1. The density of existing gazetteer data of various types is illustrated by colors in the map. Regions for which there are many geographic names in the gazetteer are colored red, and regions with few or none are dark, for example. Intermediate regions are intermediate shades between red and black. The user can select which types of geographic names are included in the density count. For example, the user can decide to only view the density of natural feature names or the density of buildings and roads.

2. Population centers of various sizes can be represented by circles of various sizes in the map. Population centers tend to have many named locations, so when a user sees that a population center has relatively few gazetteer names compared to other places, they can deduce that more RLEs should be processed in that area.

3. The density of GTS searches performed by users can also be presented by a density display similar to the gazetteer data density display. By seeing where others have searched, a user can assess which areas are more important to people looking for information. These areas are probably valuable, so processing more RLEs for such an area is thus more valuable.

4. The density of gazetteer requests is also useful for people interested in processing the most useful RLEs. By allowing other users to submit requests for more gazetteer data in particular areas and in particular languages, the system allows for community collaboration in choosing what RLEs to process. These requests or votes indicate areas for which more map labels would be valuable. Our user interface for collecting these requests from other users is novel. The user interface has a "request more" checkbox. When the user checks this checkbox, and drags their map view over an area, that area is recorded and sent to the server. The server records this area and any keywords the user has entered. The server records this information as having had a user request for more information. The system favors more specific requests, so when a user zooms into a small area or enters a keyword string with rare terms, then the server notes this specificity by recording the area of the map and the frequency of occurrence of the search terms. When a person asks which areas have been requested the system boosts the visual appearance of these more specific queries by making them hotter colors with higher intensity in the density display.

A number of embodiments of the invention have been described. Nevertheless, it will be understood that various modifications may be made without departing from the spirit and scope of the invention. Accordingly, other embodiments are within the scope of the following claims.

What is claimed is:

1. A non-transitory computer-readable storage medium carrying one or more sequences of one or more instructions which, when executed by one or more processors, cause an apparatus to at least perform the following:
   causing, at least in part, a rendering of an image of a region of a metric vector space in a map image;
   determining, within the map image of the region of the metric vector space, a pixel extent containing one or more sets of contiguous pixels having a text color, wherein the pixel extent comprises a raster label extract (RLE);
   determining a confidence score for each RLE representing a likelihood that the pixel extent actually contains a textual annotation;
   causing, at least in part, a generation of a text string for each RLE based on the pixel extent, a detection of a user input entering the text string based on the pixel extent, or a combination thereof;
   causing to display, on a user interface, a list of RLEs with the corresponding confidence score and an associated image of the RLE, a set of extraction state controls for each RLE, wherein a extraction state control for each RLE displays information about the RLE; and
   causing, at least in part, a change to a state of the RLE through detection of a user input modifying a state associated with the pixel extent via the user interface, wherein the modifying the state includes at least one of entering a new text string, correcting the incorrect text string, validating the correct text string, or a combination thereof.

2. The non-transitory computer-readable storage medium of claim 1, wherein determining the confidence score is based, at least in part, on determining a width, a height, or a combination thereof of the pixel extent.

3. The non-transitory computer-readable storage medium of claim 2, wherein the pixel extent and the text string are stored in at least one of a gazetteer database and a searchable location-related database.

4. The non-transitory computer-readable storage medium of claim 1, wherein the apparatus is caused, at least in part, to further perform:
   causing, at least in part, a detection of a user input modifying the confidence score corresponding to the pixel extent; and
   causing, at least in part, a rendering of the confidence score corresponding to the pixel extent.

5. The non-transitory computer-readable storage medium of claim 1, wherein the apparatus is caused, at least in part, to further perform:
   determining coordinates for a location in the metric vector space depicted by the map image and associated with the pixel extent.

6. The non-transitory computer-readable storage medium of claim 5, wherein the apparatus is caused, at least in part, to further perform:
   causing, at least in part, a storing of the pixel extent and the coordinates.

7. The non-transitory computer-readable storage medium of claim 6, wherein the pixel extent and the coordinates are stored in at least one of a gazetteer database and a searchable location-related database.

8. The non-transitory computer-readable storage medium of claim 1, wherein the map image of the region comprises a scanned paper map and the textual annotation indicates information relating to a location of the textual annotation on the scanned paper map.

9. A method comprising:
   causing, at least in part, a rendering of an image of a region of a metric vector space in a map image;
   determining, within the map image of the region of the metric vector space, a pixel extent containing one or more sets of contiguous pixels having a text color, wherein the pixel extent comprises a raster label extract (RLE);
   determining a confidence score for each RLE representing a likelihood that the pixel extent actually contains a textual annotation;
   causing, at least in part, a generation of a text string for each RLE based on the pixel extent, a detection of a user input entering the text string based on the pixel extent, or a combination thereof;
   causing to display, on a user interface, a list of RLEs with the corresponding confidence score and an associated image of the RLE, a set of extraction state controls for each RLE, wherein a extraction state control for each RLE displays information about the RLE; and
   causing, at least in part, a change to a state of the RLE through detection of a user input modifying a state associated with the pixel extent via the user interface, wherein the modifying the state includes at least one of entering a new text string, correcting the incorrect text string, validating the correct text string, or a combination thereof.

10. The method of claim 9, wherein determining the confidence score is based, at least in part, on determining a width, a height, or a combination thereof of the pixel extent.

11. The method of claim 10, wherein the pixel extent and the text string are stored in at least one of a gazetteer database and a searchable location-related database.

12. The method of claim 9, further comprising:
    causing, at least in part, a detection of a user input modifying the confidence score corresponding to the pixel extent; and
    causing, at least in part, a rendering of the confidence score corresponding to the pixel extent.

13. The method of claim 9, further comprising causing, at least in part, an obtaining of coordinates for a location in the metric vector space depicted by the map image and associated with the pixel extent.

14. The method of claim 13, further comprising causing, at least in part, a storing of the pixel extent and the coordinates.

15. The method of claim 14, wherein the pixel extent and the coordinates are stored in at least one of a gazetteer database and a searchable location-related database.

16. The method of claim 9, wherein the map image of the region comprises a scanned paper map and the textual annotation indicates information relating to a location of the textual annotation on the scanned paper map.

* * * * *